US012053433B2

(12) United States Patent
Afzali et al.

(10) Patent No.: US 12,053,433 B2
(45) **Date of Patent: *Aug. 6, 2024**

(54) MODULAR DISPENSER FOR SINGLE OBJECTS

(71) Applicant: CVS Pharmacy, Inc., Woonsocket, RI (US)

(72) Inventors: Adam A. Afzali, Duxbury, MA (US); Kyle Benton, Randolph, MA (US); Jessica H. Donohue, Bolton, MA (US); Donovan Duchak, Franklin, MA (US); Regan M. Fiascone, Boston, MA (US); Jamila S. Gramsey, Boston, MA (US); Darryl P. James, Beverly, MA (US); Andreas Senai, Framingham, MA (US); Timothy S. Tocci, Roxbury, MA (US); Elizabeth K. Winter, Carlisle, MA (US)

(73) Assignee: CVS Pharmacy, Inc., Woonsocket, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,800

(22) Filed: Mar. 30, 2023

(65) Prior Publication Data

US 2023/0233413 A1 Jul. 27, 2023

Related U.S. Application Data

(63) Continuation of application No. 17/401,243, filed on Aug. 12, 2021, now Pat. No. 11,642,286.

(Continued)

(51) Int. Cl.

| | |
|---|---|
| ***A61J 7/00*** | (2006.01) |
| ***A61J 1/03*** | (2023.01) |
| ***B65D 83/04*** | (2006.01) |

(52) U.S. Cl.

CPC ............... *A61J 7/0076* (2013.01); *A61J 1/03* (2013.01); *B65D 83/04* (2013.01); *B65D 83/0409* (2013.01); *B65D 2583/044* (2013.01)

(58) Field of Classification Search

CPC ........................................................ A61J 1/03

(Continued)

(56) References Cited

U.S. PATENT DOCUMENTS

| | | | |
|---|---|---|---|
| 382,541 | A | 5/1888 | Martin |
| 1,173,069 | A | 2/1916 | Walker |

(Continued)

FOREIGN PATENT DOCUMENTS

| | | |
|---|---|---|
| CA | 2291558 | 9/2009 |
| CN | 202529158 U | 11/2012 |

(Continued)

OTHER PUBLICATIONS

Chinese Foreign Office Action dated Nov. 23, 2023, 11 pgs.

(Continued)

*Primary Examiner* — Gene O Crawford
*Assistant Examiner* — Ayodeji T Ojofeitimi
(74) *Attorney, Agent, or Firm* — Patent Law Works, LLP

(57) ABSTRACT

A modular dispenser includes a cartridge configured to hold a plurality of pills. The cartridge includes an opening through which the at least one pill is configured to pass under an influence of gravity. A dispensing base is configured to removably receive the cartridge. The dispensing base includes a funnel with a funnel inlet proximate the opening of the cartridge and a funnel outlet spaced apart from the funnel inlet. A dispensing assembly is rotatably coupled to (Continued)

the dispensing base. The dispensing base also includes a catch configured to receive the at least one pill when the catch is proximate the funnel outlet and rotate away from the funnel outlet to a position from which the at least one pill is retrievable by a user.

20 Claims, 28 Drawing Sheets

Related U.S. Application Data

(60) Provisional application No. 63/064,679, filed on Aug. 12, 2020.

(58) Field of Classification Search
USPC .......................................................... 221/255
See application file for complete search history.

(56) References Cited

U.S. PATENT DOCUMENTS

| | | | |
|---|---|---|---|
| 1,471,621 | A | 10/1923 | Mccord |
| 1,685,183 | A | 9/1928 | Wilhelm |
| 2,180,916 | A | 11/1939 | Steuernagel |
| 2,291,558 | A | 7/1942 | Peterson |
| 2,342,748 | A | 2/1944 | Richard |
| 2,378,868 | A | 6/1945 | Richmond et al. |
| 2,669,349 | A | 2/1954 | Silver |
| 3,313,451 | A | 4/1967 | Rhindress |
| 4,287,921 | A | 9/1981 | Sanford |
| 4,531,658 | A | 7/1985 | Galopin |
| 5,148,944 | A | 9/1992 | Kaufman |
| 5,174,471 | A | 12/1992 | Kozlowski |
| 5,211,308 | A | 5/1993 | Decker |
| 5,219,093 | A | 6/1993 | Moulding, Jr. |
| 5,421,491 | A | 6/1995 | Tuvim |
| 5,730,333 | A | 3/1998 | Baluk |
| 5,979,717 | A | 11/1999 | Dalton |
| 6,622,887 | B1 | 9/2003 | Roediger |
| 6,997,341 | B2 | 2/2006 | Pearson |
| 7,461,763 | B1 | 12/2008 | Winn |
| 7,555,362 | B2 | 6/2009 | Broussard |
| 7,870,974 | B2 | 1/2011 | Miller |
| 8,020,724 | B2 | 9/2011 | Remis |
| 8,521,326 | B1 | 8/2013 | Holtje |
| 8,657,155 | B2 | 2/2014 | Dwork |
| 9,117,325 | B1 | 8/2015 | Sloan |
| 9,150,346 | B1 | 10/2015 | Aramian |
| 9,241,873 | B2 | 1/2016 | Upchurch |
| 9,387,153 | B1 | 7/2016 | Mazur |
| 9,501,887 | B2 | 11/2016 | Berg |
| 9,636,279 | B2 | 5/2017 | Song |
| 9,849,069 | B1 | 12/2017 | Khatri |
| 9,870,450 | B2 | 1/2018 | Blackburn |
| 9,908,686 | B2 | 3/2018 | Wang |
| 10,360,751 | B2 | 7/2019 | Berg |
| 11,642,286 | B2 | 5/2023 | Afzali |
| 2004/0039481 | A1 | 2/2004 | De La Huerga |
| 2004/0065579 | A1 | 4/2004 | Wood |
| 2005/0077314 | A1 | 4/2005 | Boykin |
| 2008/0027579 | A1 | 1/2008 | van der Hoop |
| 2009/0145931 | A1 | 6/2009 | Peng |
| 2012/0234248 | A1 | 9/2012 | Lytle |
| 2013/0213998 | A1 | 8/2013 | Mills |
| 2014/0319164 | A1 | 10/2014 | Wilson |
| 2015/0266654 | A1 | 9/2015 | Baarman |
| 2017/0079887 | A1 | 3/2017 | Song |
| 2017/0304153 | A1 | 10/2017 | Williamson |
| 2017/0333283 | A1 | 11/2017 | Park |
| 2018/0303718 | A1 | 10/2018 | Song |
| 2018/0319570 | A1 | 11/2018 | Baarman |
| 2019/0337708 | A1 | 11/2019 | Li |
| 2019/0389277 | A1 | 12/2019 | Wade |
| 2020/0022875 | A1 | 1/2020 | Park |
| 2020/0289375 | A1 | 9/2020 | Sujith |
| 2022/0047460 | A1 | 2/2022 | Afzali |

FOREIGN PATENT DOCUMENTS

| | | | |
|---|---|---|---|
| CN | 102917680 | A | 2/2013 |
| CN | 107438395 | A | 12/2017 |
| CN | 108602610 | A | 9/2018 |
| CN | 109998914 | | 7/2019 |
| CN | 111467238 | A | 7/2020 |
| CN | 211168197 | U | 8/2020 |
| KR | 20170091521 | A1 | 1/2017 |
| KR | 20170091521 | A1 | 8/2017 |
| KR | 291558 | | 9/2022 |

OTHER PUBLICATIONS

Translation of Chinese Office Action dated Nov. 23, 2023, 14 pgs.
International Preliminary Report on Patentability for International Application No. PCT/US2021/045773, mailed Feb. 23, 2023, 7 pgs.
Communication pursuant to Rules 161(1) and 162 EPC issued from the European Patent Office for EP Application No. 21766071.1 on Mar. 21, 2023, 3 pgs.
Communication pursuant to Rules 161(1) and 162 EPC issued from the European Patent Office for EP Application No. 2177739.8 on Mar. 21, 2023, 3 pgs.
International Search Report and Written Opinion for International Application No. PCT/US2021/045820, mailed Nov. 11, 2021, 13 pgs.
International Search Report and Written Opinion for International Application No. PCT/US2021/045773, mailed Dec. 6, 2021, 46 pgs.

MODULAR DISPENSER FOR SINGLE OBJECTS

BACKGROUND

Many people take pills, such as medications, vitamins, and supplements on a regular basis, sometimes even daily or several times each day. Presently, pills typically are dispensed in a child-proof or tamper resistant bottle that may be difficult to manipulate, may be difficult to store, and may be unsightly to keep in public view.

Consequently, there is a need for a modular dispenser that easily and conveniently stores and quickly dispenses to a user a pill of a variety of shapes and sizes. The modular dispenser should be suitable for storage on a counter or in an easily remembered and visible location.

BRIEF SUMMARY

A modular dispenser provides a user with the ability to organize and quickly and easily dispense an individual or single pill.

In one aspect, a modular dispenser comprising a cartridge configured to hold a plurality of pills. The cartridge comprises an opening through which at least one pill is configured to pass under an influence of gravity. A dispensing base is configured to removably receive the cartridge. The dispensing base comprises a funnel with a funnel inlet proximate the opening of the cartridge and a funnel outlet spaced apart from the funnel inlet. A dispensing assembly is rotatably coupled to the dispensing base. The dispensing assembly also comprises at least one catch configured to receive the at least one pill when the at least one catch is proximate the funnel outlet and to rotate the at least one catch away from the funnel outlet to a position from which the at least one pill is retrievable by a user.

Examples may comprise one of the following features or any combinations thereof.

For example, the dispensing assembly is configured to rotate in a plane perpendicular to a width of the dispensing base. The dispensing base may comprise a left side or a left panel, a right side or a right panel, and a front side or front cap that comprises a door opening through which the catch of the dispensing assembly rotatably extends away from the dispensing base.

Examples of the dispensing assembly optionally comprise a hub about which the dispensing assembly rotates. The dispensing assembly also may comprise an arc surface coupled to and spaced radially apart from the hub. In some examples, the at least one catch is coupled to the arc surface. The arc surface may comprise at least one fin extending radially away from the arc surface. The at least one fin optionally extends through a slot in a well of the funnel. The at least one fin may comprise a plurality of fins and, in some instances, the plurality of fins are spaced laterally apart from each other.

The funnel may comprise a funnel platform that extends laterally away from the funnel and the dispensing base may comprise at least one pair of ribs configured to receive the funnel platform. The funnel optionally comprises a funnel parapet extending away from the funnel towards the opening of the cartridge, wherein at least one of the funnel parapet and the perimeter of the opening of the cartridge comprises an engagement mechanism configured to engage the other of the funnel parapet and the perimeter of the opening of the cartridge. The funnel parapet may also comprise and engagement mechanism that comprises a snap-fitting configured to engage a ridge on the perimeter of the opening of the cartridge.

In some examples, the funnel comprises at least one flipper movably retained within the funnel. Optionally, the at least one fin may be configured to agitate the at least one flipper as the dispensing assembly rotates away from the funnel outlet. The at least one flipper may comprise an opening proximate the funnel inlet. The at least one flipper is flexible and be configured to return to an at rest position after the dispensing assembly is fully rotated towards the funnel outlet.

In another example, a dispensing base is configured to dispense at least one pill under an influence of gravity. The dispensing base may comprise a funnel with a funnel inlet proximate the opening of the cartridge and a funnel outlet spaced apart from the funnel inlet. The dispensing base may also comprise a dispensing assembly rotatably coupled to the dispensing base. The dispensing assembly may also comprise at least one catch configured to receive the at least one pill when the at least one catch is proximate the funnel outlet and to rotate the at least one catch away from the funnel outlet to a position from which the at least one pill is retrievable by a user.

An example of a method of assembling a modular dispenser may comprise one or more of the following steps performed in any order, including positioning a funnel adjacent to one of a left side or left panel and a right side or right panel of a dispensing base. The funnel may comprise a funnel inlet and a funnel outlet. The method may further comprise positioning a dispensing assembly with at least one catch proximate to the funnel and adjacent to one of the left side or the left panel and the right side or right panel of the dispensing base to which the funnel is positioned. The method may also comprise rotating the at least one catch away from the funnel outlet, coupling the left side or left panel to the right side or right panel of the dispensing base. The method optionally comprises coupling a front side or a front cap to the left panel and the right panel. Optionally, the method also comprises movably coupling a flipper to the funnel.

All examples and features mentioned above can be combined in any technically possible way

BRIEF DESCRIPTION OF THE DRAWINGS

To further clarify the above and other advantages and features of the examples, reference to examples are illustrated in the appended drawings. The drawings depict only typical examples and are therefore not to be considered limiting. One or more examples will be described and explained with additional specificity and detail through the use of the accompanying drawings in which.

Common element numbers represent common features, even if the appearance of a feature varies slightly between the figures.

The drawings are not necessarily to scale.

DETAILED DESCRIPTION

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

For purposes of this application, the term pill or pills is used to generically and collectively refer to one or more pills, capsules, soft gels, caplets, tablets, chewables, medication, vitamins, minerals, supplements, homeopathic substances and remedies, and the like.

Figure 1:
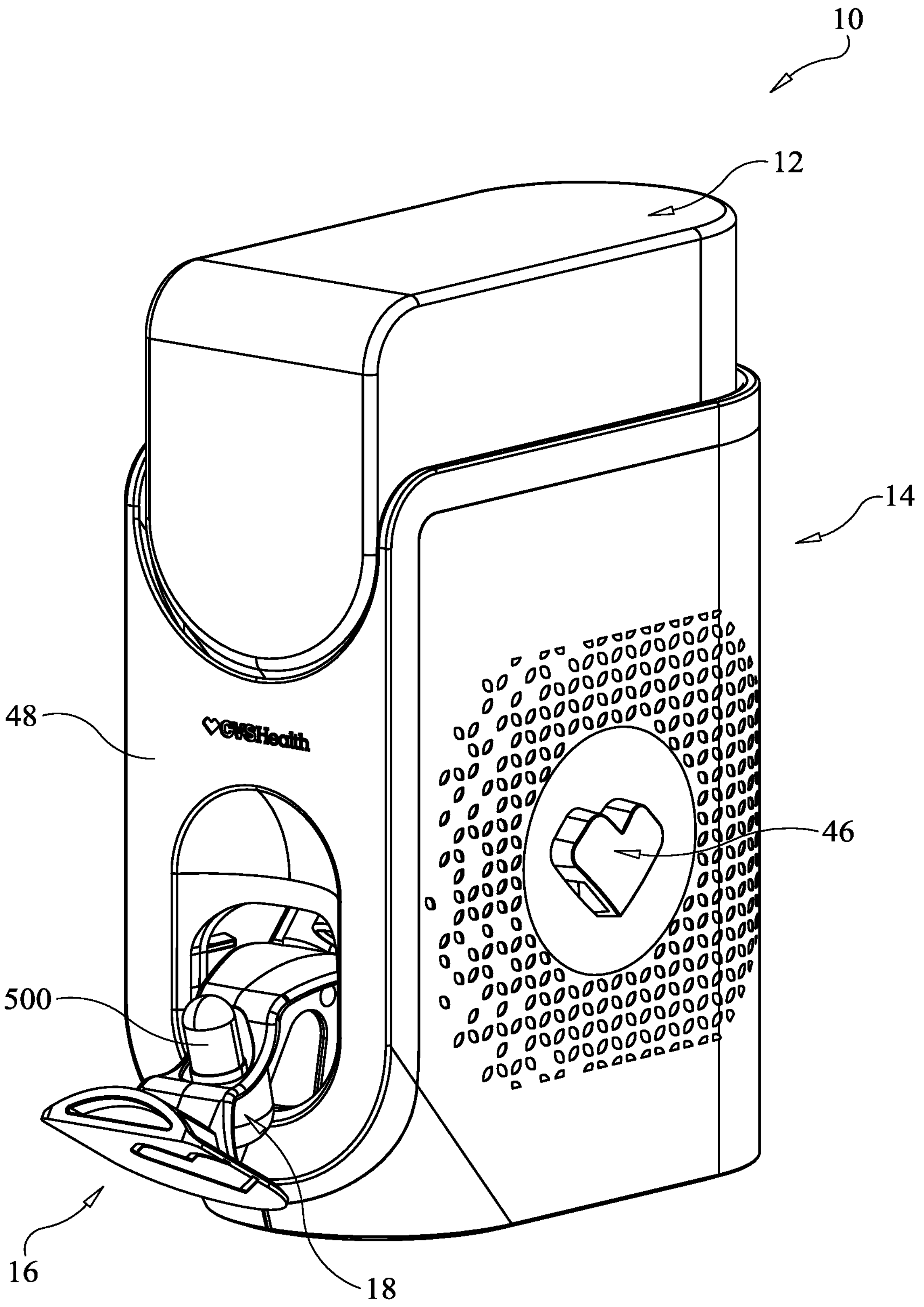
FIG. 1 is an example of a modular dispenser with an example of a cartridge, dispensing base, and dispensing assembly.
Figure 2:
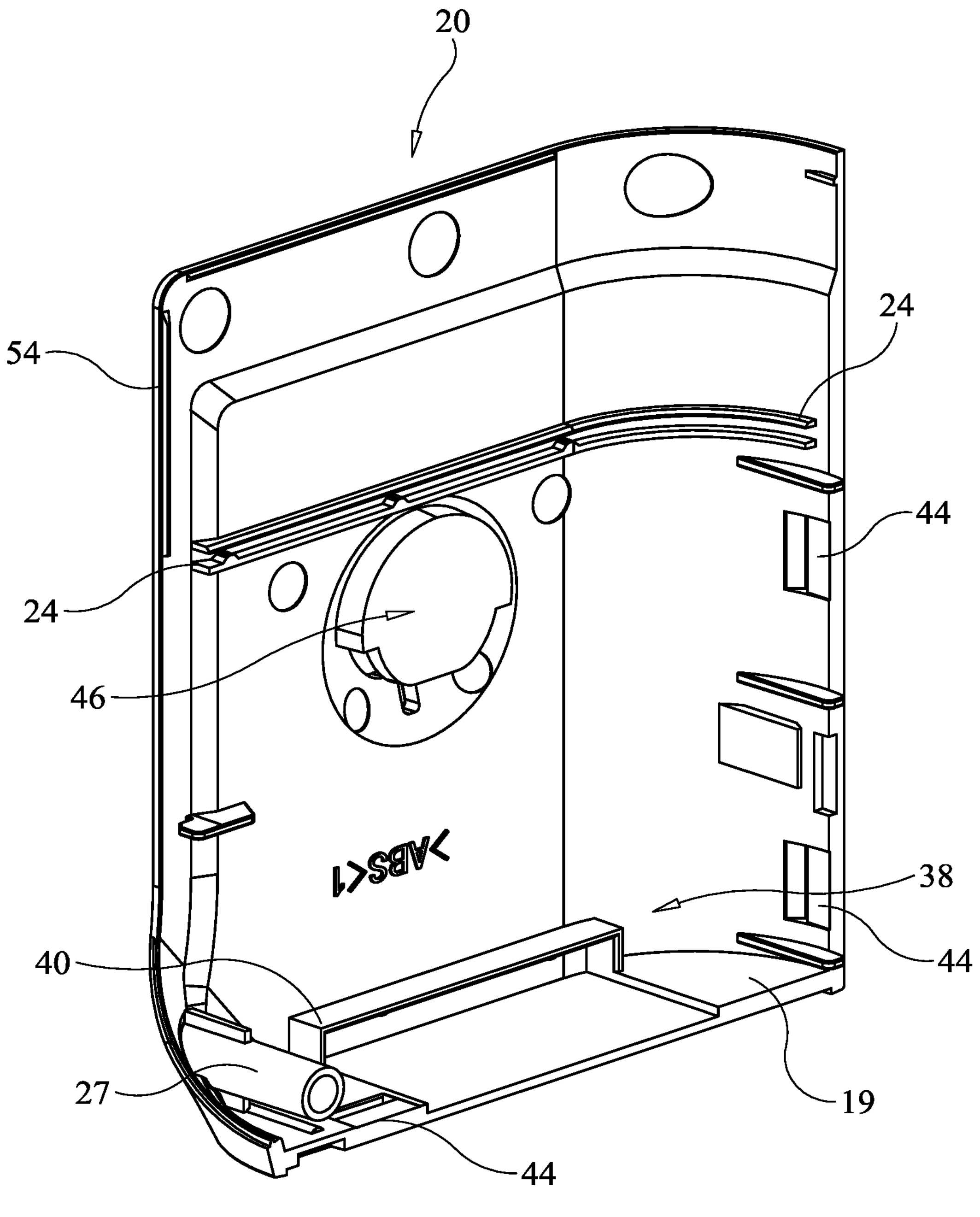
FIG. 2 is perspective view of an example of a left side or left panel of the dispensing base.
Figure 3A:
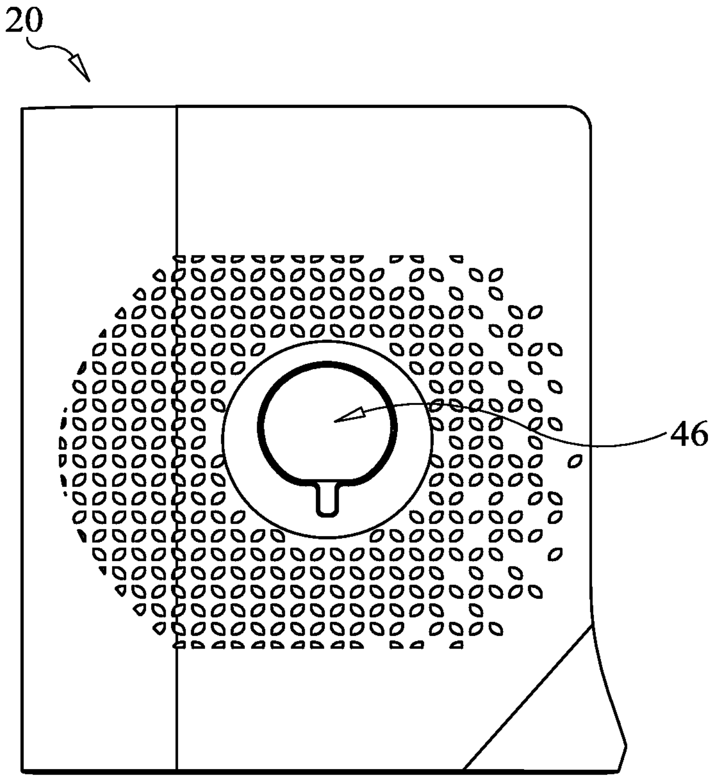
FIG. 3A-3C are plan views of the left side or left panel of FIG. 2.
Figure 3C:
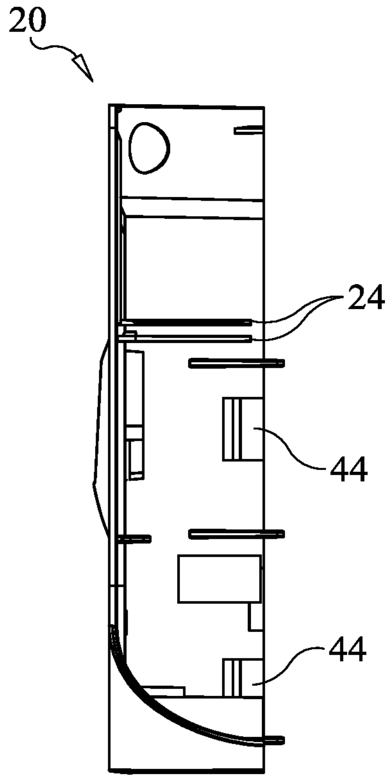
Figure 3B:
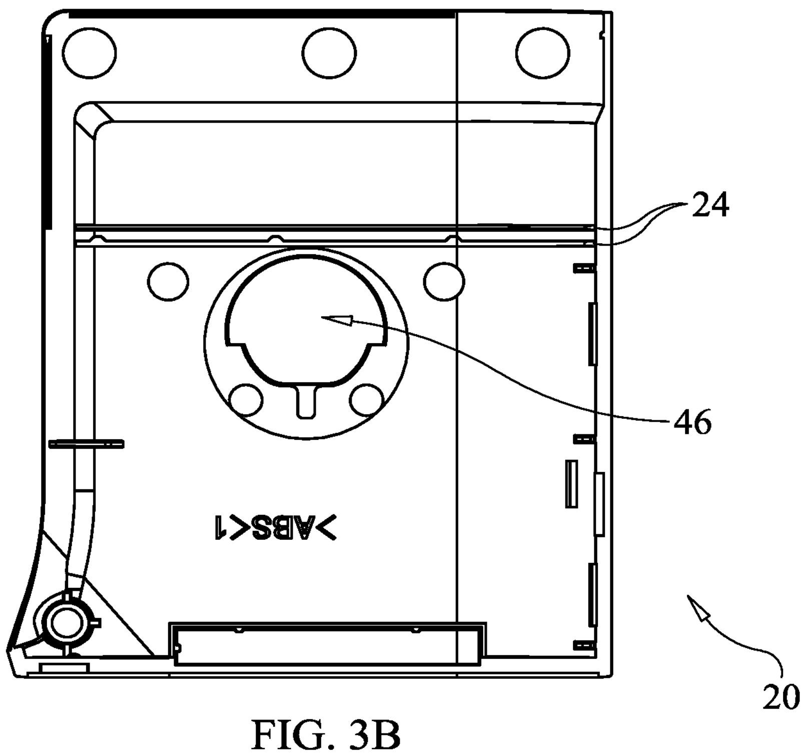
Figure 4A:
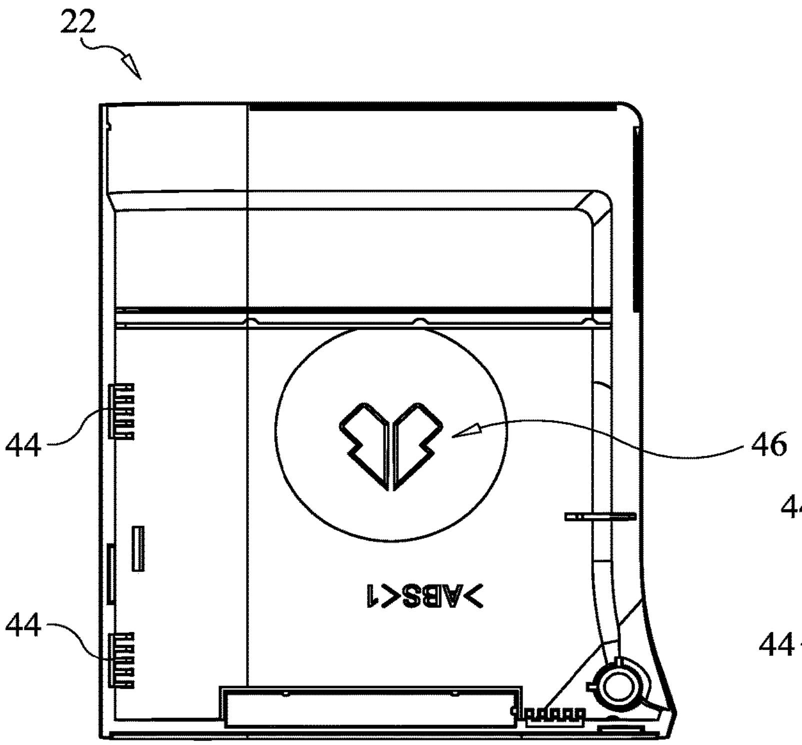
FIG. 4A-4C are plan views of an example of a right side or right panel of the dispensing base.
Figure 4C:
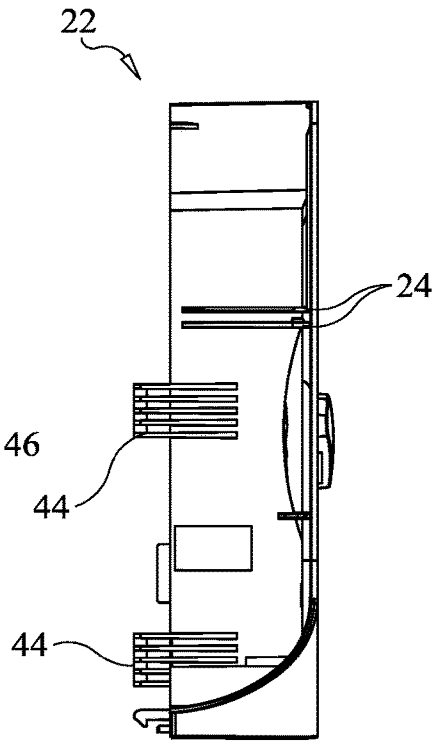
Figure 4B:
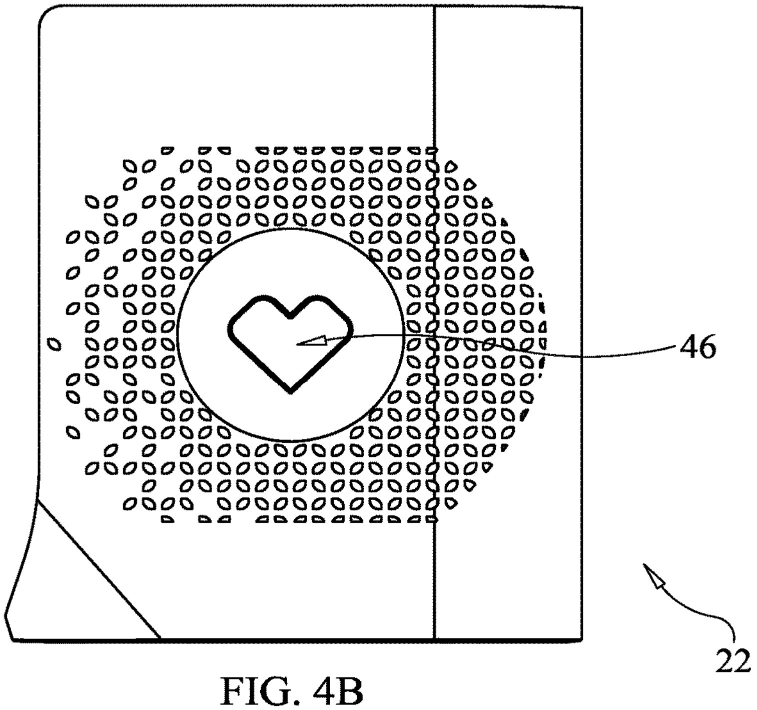
Figure 5:
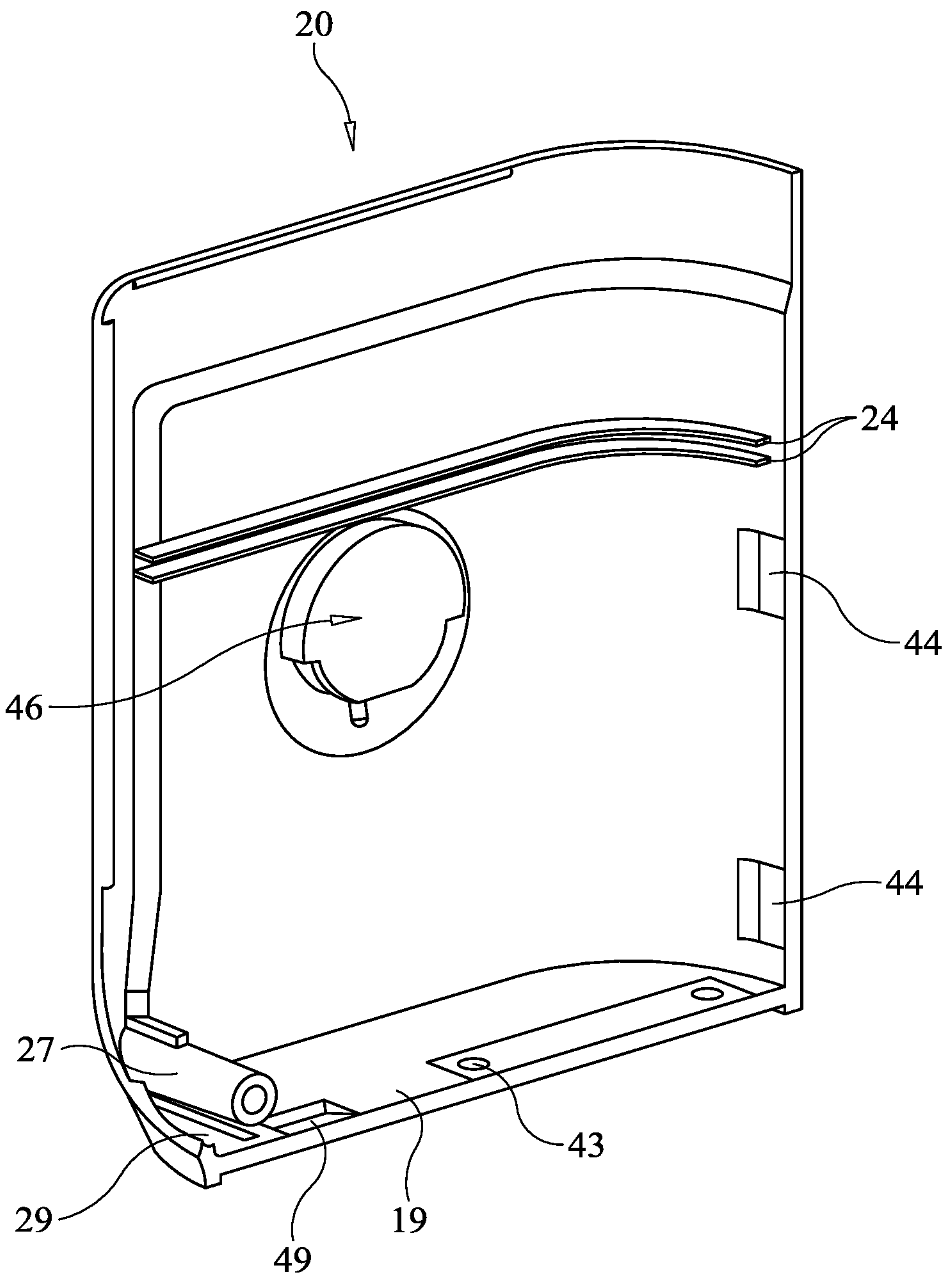
FIG. 5 is perspective view of another example of a left side or left panel of the dispensing base.
Figure 6A:
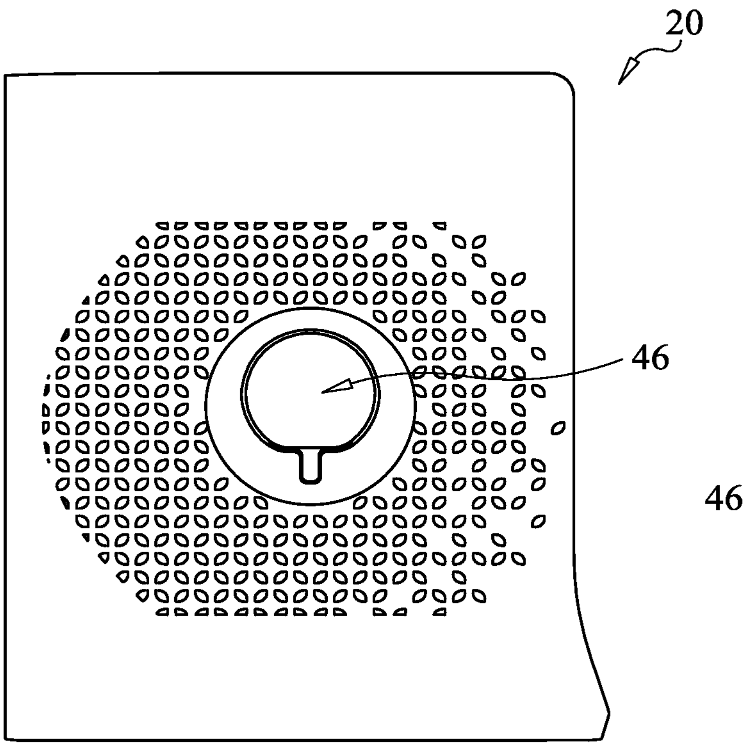
FIG. 6A-6C are plan views of the left side or left panel of FIG. 2.
Figure 6C:
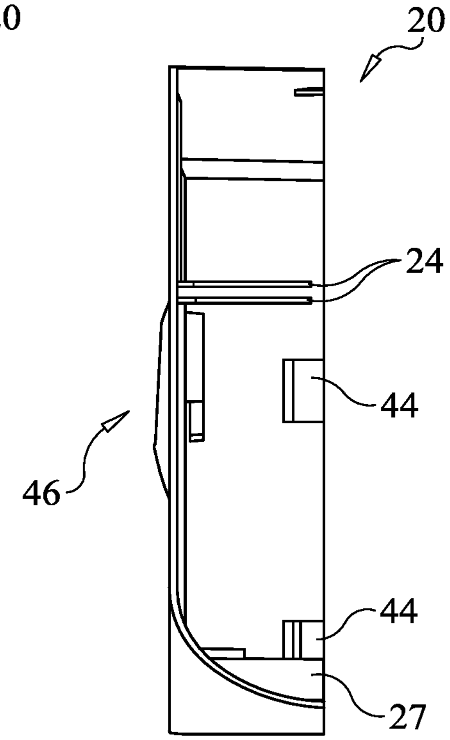
Figure 6B:
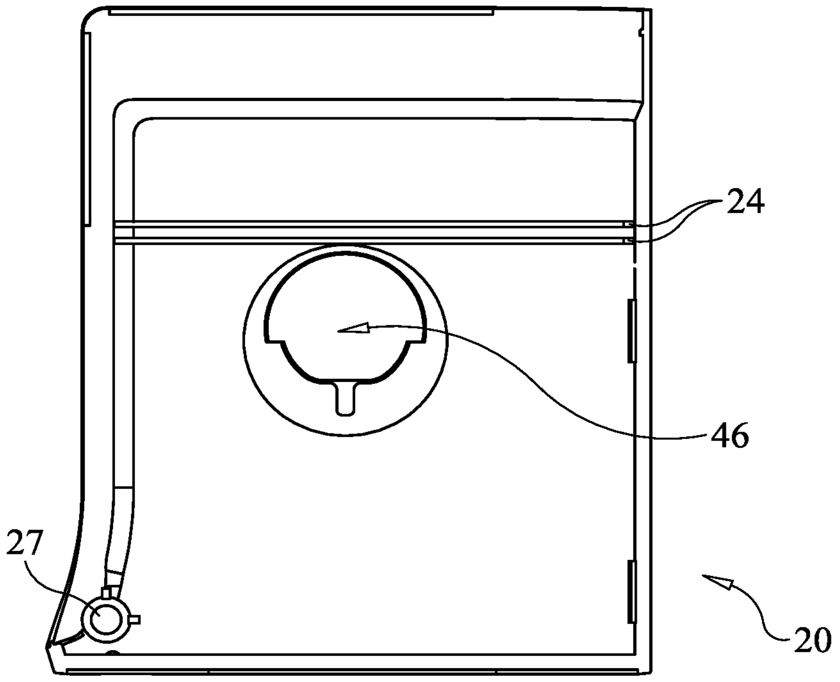
Figure 7A:
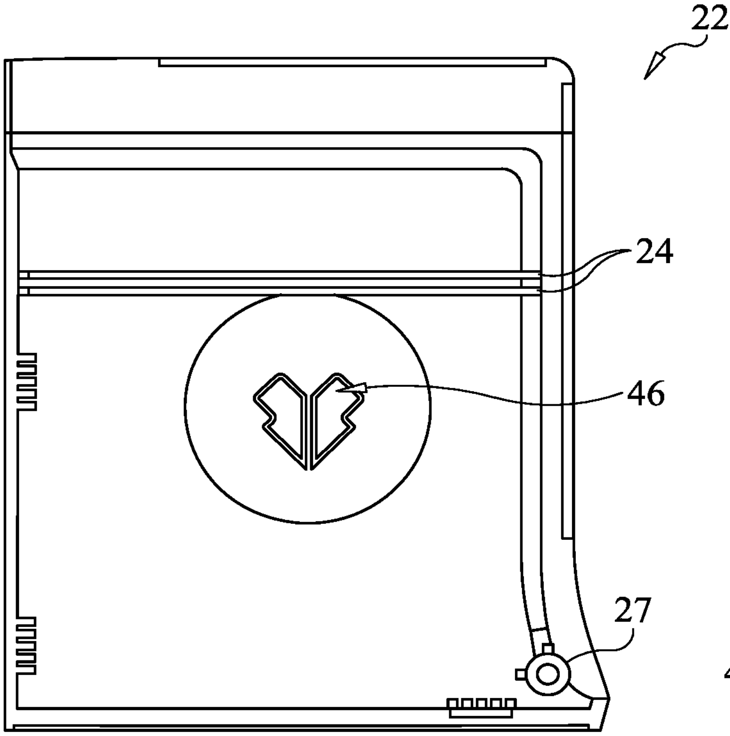
FIG. 7A-7C are plan views of another example of a right side or right panel of the dispensing base.
Figure 7C:
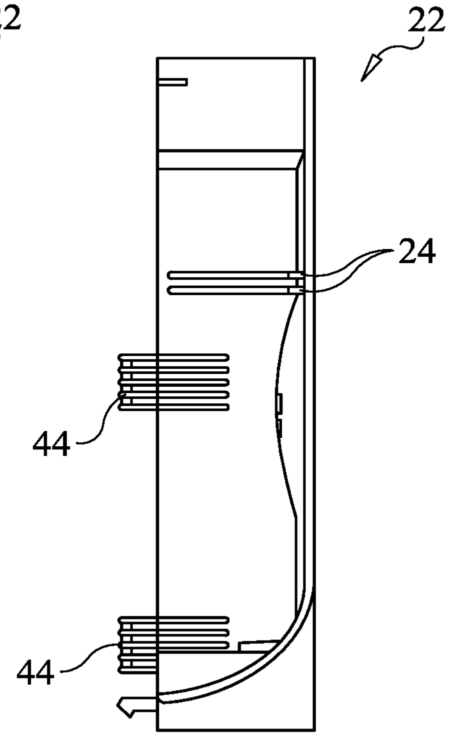
Figure 7B:
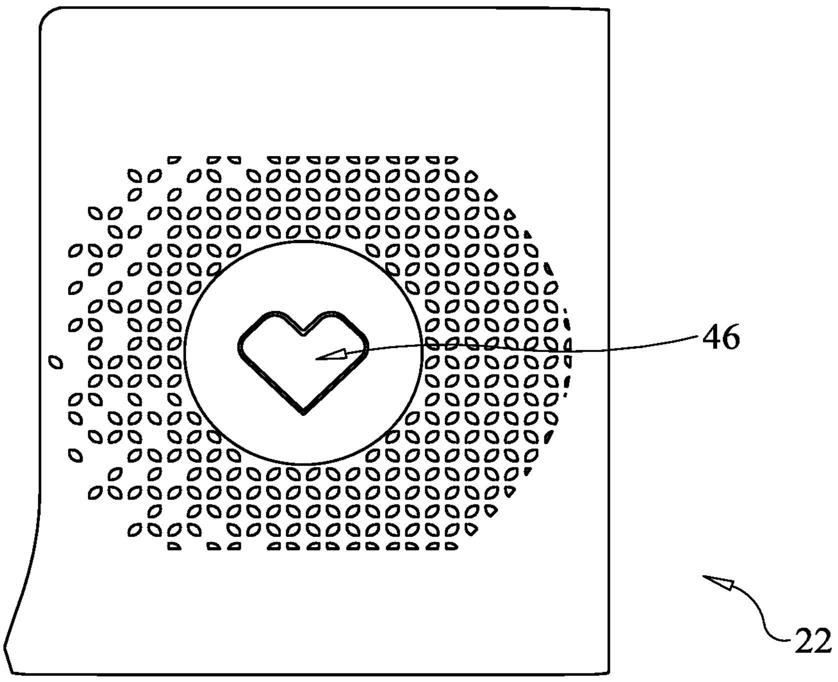

FIG. 1 illustrates an example of a modular dispenser 10 with a removable and, optionally, refillable cartridge 12 configured to hold a plurality of pills. A dispensing base 14 is configured to removably receive the cartridge 12. The dispensing base comprises a dispensing assembly 16 rotatably coupled to the dispensing base 14. The dispensing assembly 16 may comprise at least one catch 18 configured to receive at least one pill 500 when the at least one catch 18 is proximate a funnel outlet 88 and to rotate the at least one catch 18 away from the funnel outlet 88 to a position from which the at least one pill 500 is retrievable by a user.

FIGS. 2-7C illustrate examples of a left panel or left side 20 and a right panel or right side 22 of the dispensing base 14. The left side 20 and the right side 22 typically are mirror images of each other except for various complementary engagement features as will become apparent in the following discussion. In addition, the example of the left side 20 and the right side 22 illustrated in FIG. 2-4C includes many common elements with the left side 20 and the right side 22 illustrated in FIG. 5-7C, with any differences identified in the text and/or apparent from the drawings. Any of the features illustrated in FIG. 2-4C may be used in addition to or alternatively to any of the features illustrated in FIG. 5-7C and vice-versa. Consequently, while most features will be illustrated and discussed within the context of the left side 20, the same feature optionally may exist on the right side 22 of the dispensing base 14.

The left side 20 and right side 22 may be formed of any material, such as metal, wood, and plastic. Typically, a molded or cast plastic is used to form the left side 20 and right side 22.

The left side 20 may include at least one pair of ribs 24 upon an interior portion of each side 20, 22. The ribs 24 are configured to receive a platform 102 of the funnel 78 as discussed below. The ribs 24 optionally may project inward or away from the left side 20 in a direction towards the right side 22.

Figure 22:
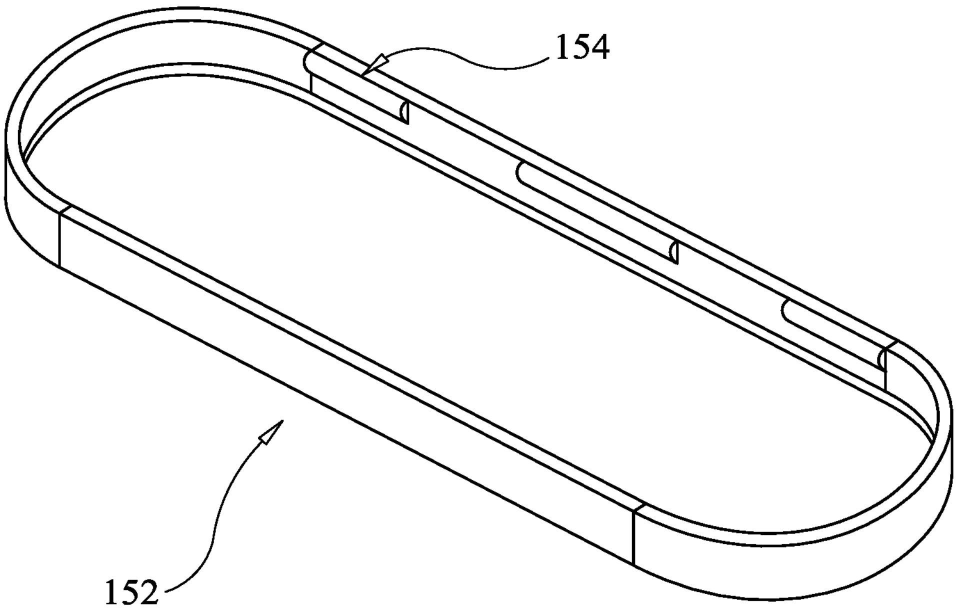
FIG. 22 is a perspective view of the lid of FIG. 19.
Figure 23:
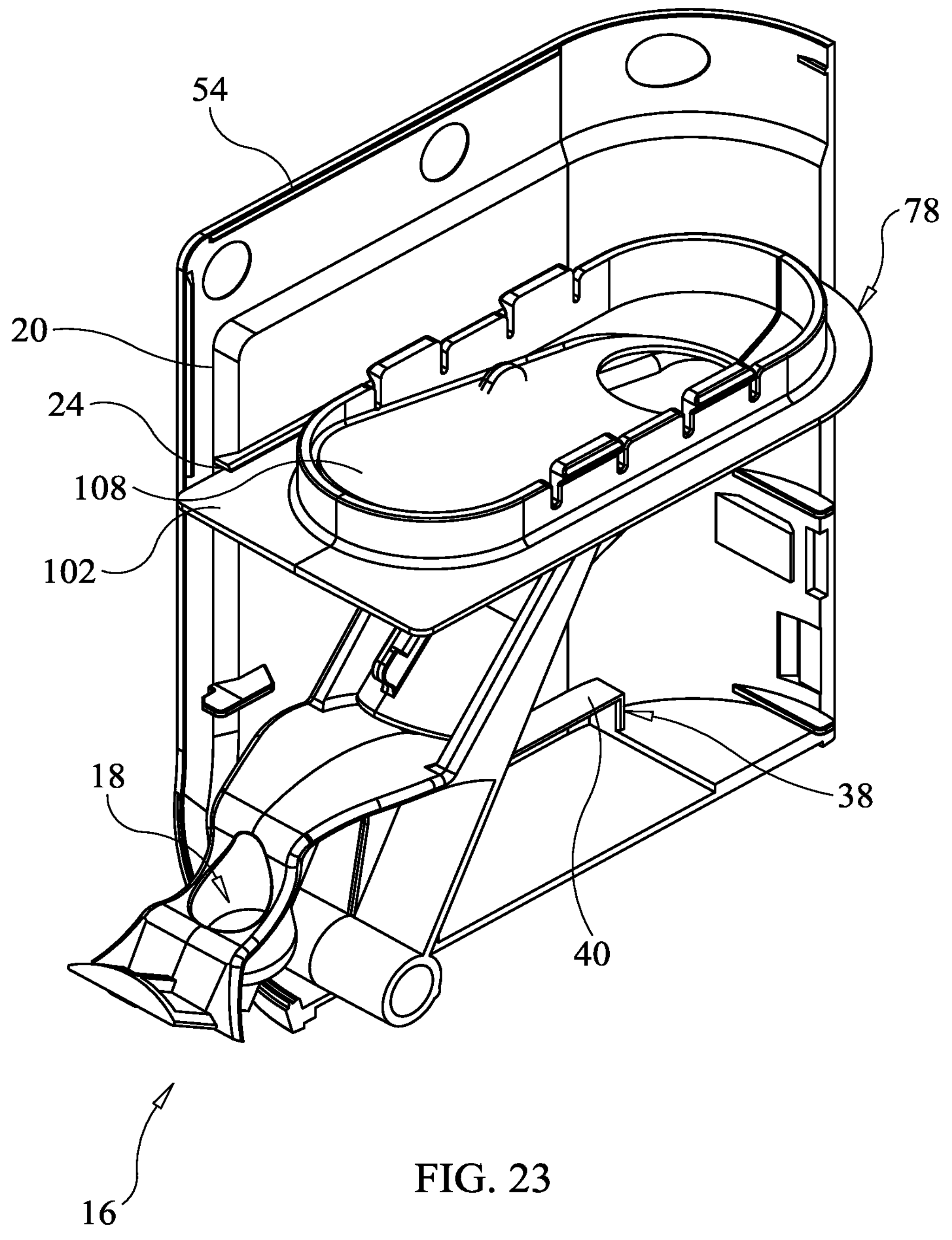
FIG. 23 through 27 are perspective views of an example of assembling or manufacturing a modular dispenser.
Figure 24:
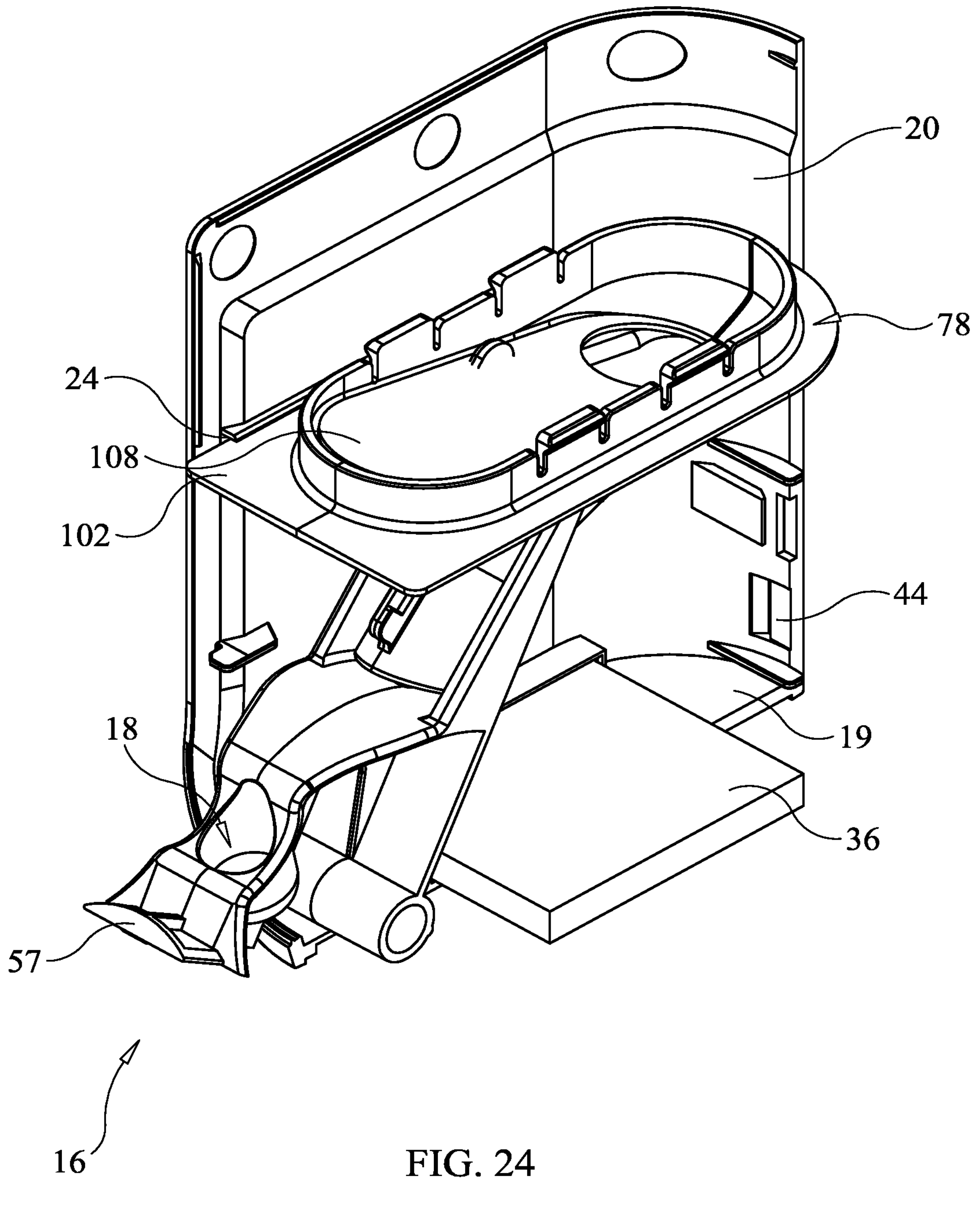
Figure 25:
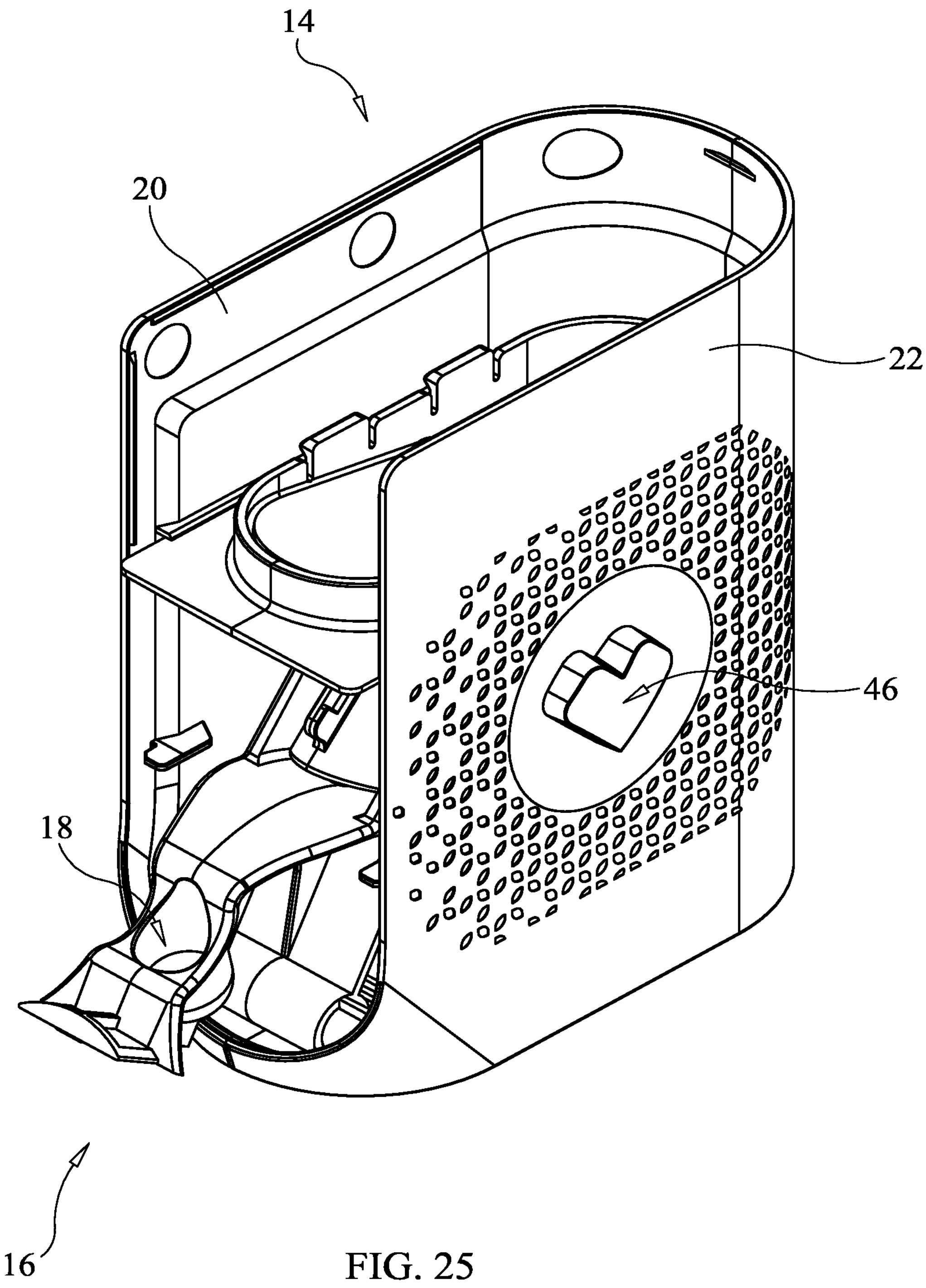
Figure 26:
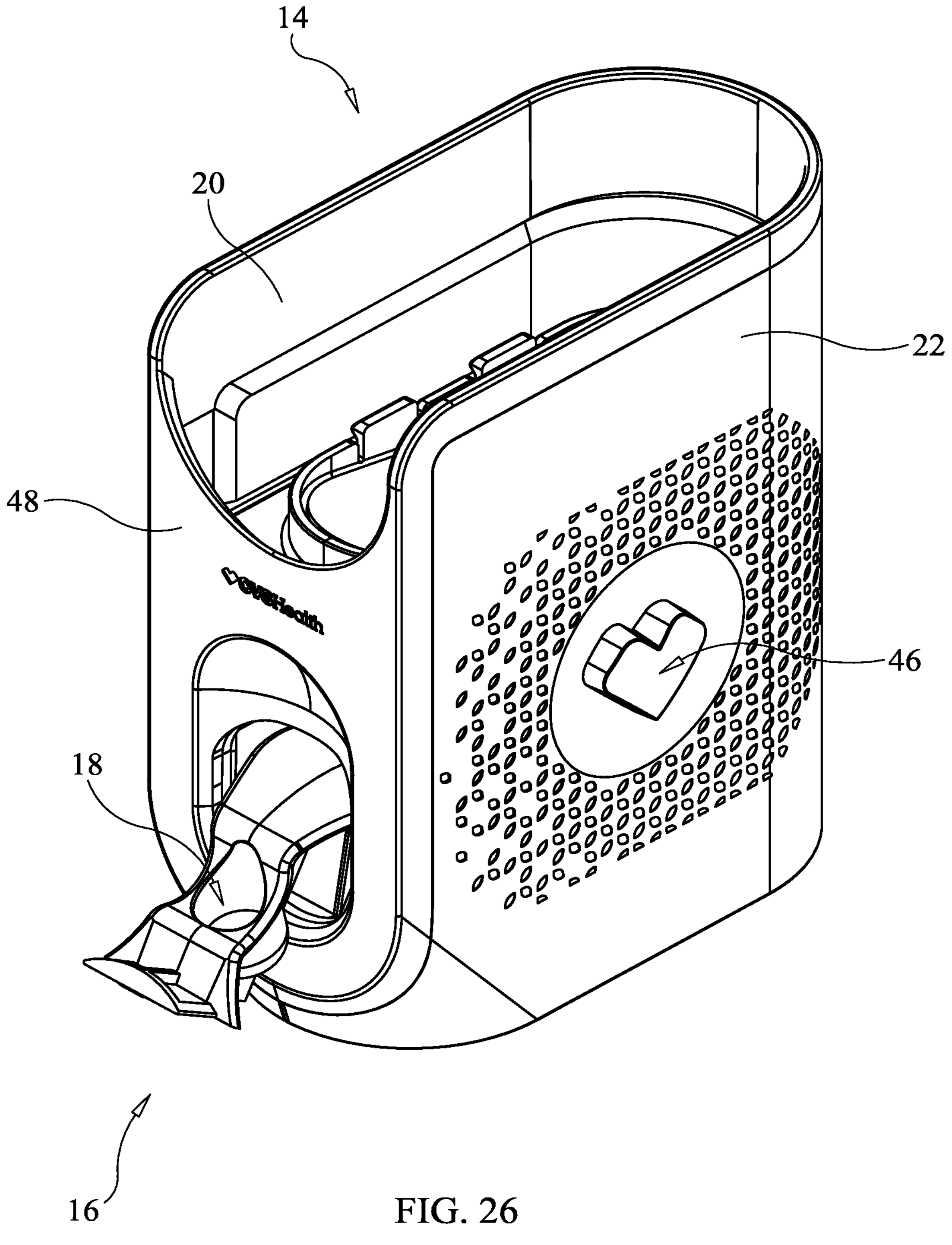

The dispensing base 14 may include a ballast 36 as illustrated in FIG. 22. The ballast 36 may help maintain the modular dispenser 10 in an upright position or otherwise reduce the risk that the modular dispenser 10 might tip during use. The ballast 36 may be made of any material, including metal or plastic, and is typically denser than the material out of which the modular dispenser 10 and its subcomponents are made. The ballast 36 may be made of aluminum, stainless steel, and other similar metals. The left side 20 may include a ballast retention structure 38 configured to retain the ballast 36 in position within the dispensing base 14. The ballast retention structure 38 may include one or more planar surfaces 40 that extend away from the dispensing base 14, ballast ribs that extend away from the dispensing base, alignment features on a bottom 19 of the left side 20, or through holes 43 configured to receive a screw that then is fastened to the ballast 36.

The dispensing base 14 may also include one or more alignment features 44 with complementary structures on the left side 20 and the right side 22. The alignment features 44 may be snap fit structure, key and slot, recesses configured to receive flexible tabs/fingers, and so forth.

The dispensing base 14 may include complementary coupling structures 46 on an exterior of the left side 20 and the right side 22. The coupling structures 46 may allow a user to couple and decouple adjacent dispensing bases 14 to each other to allow for easy and convenient storage of multiple dispensing bases 14 together. The coupling structures 26 may be of any type, including a key and slot—as illustrated, the heart is a key that fits into a complementary slot—snap fit structures, and so forth.

Figure 8A:
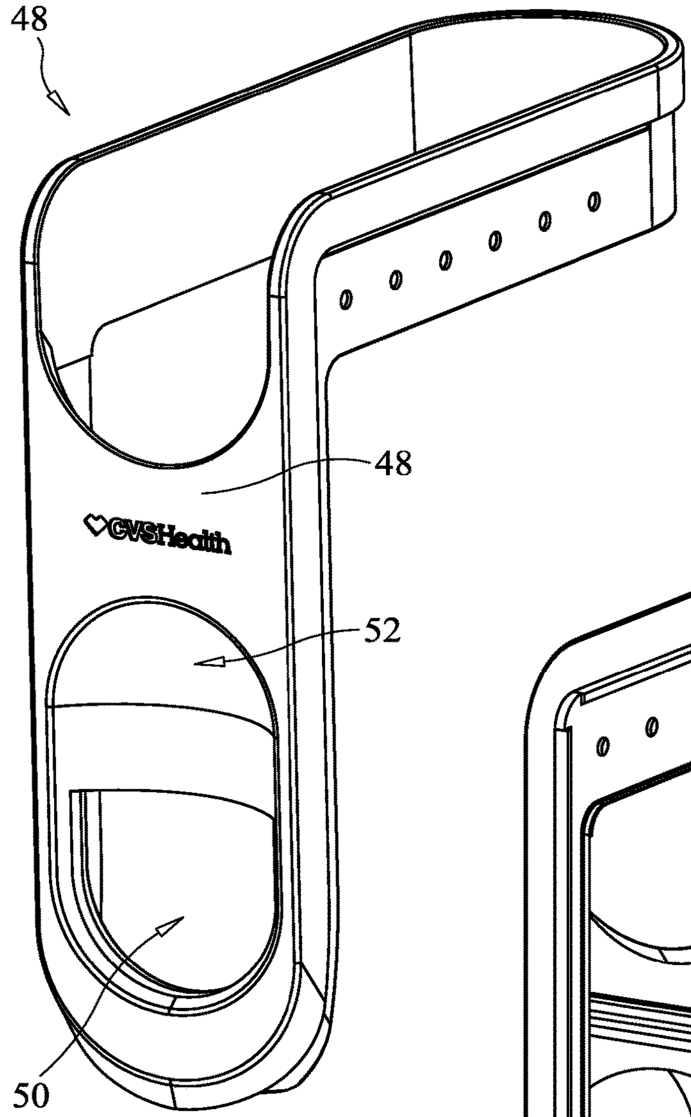
FIGS. 8A and 8B are front and rear perspective views of a front side or a front cap of the dispensing base.
Figure 8B:
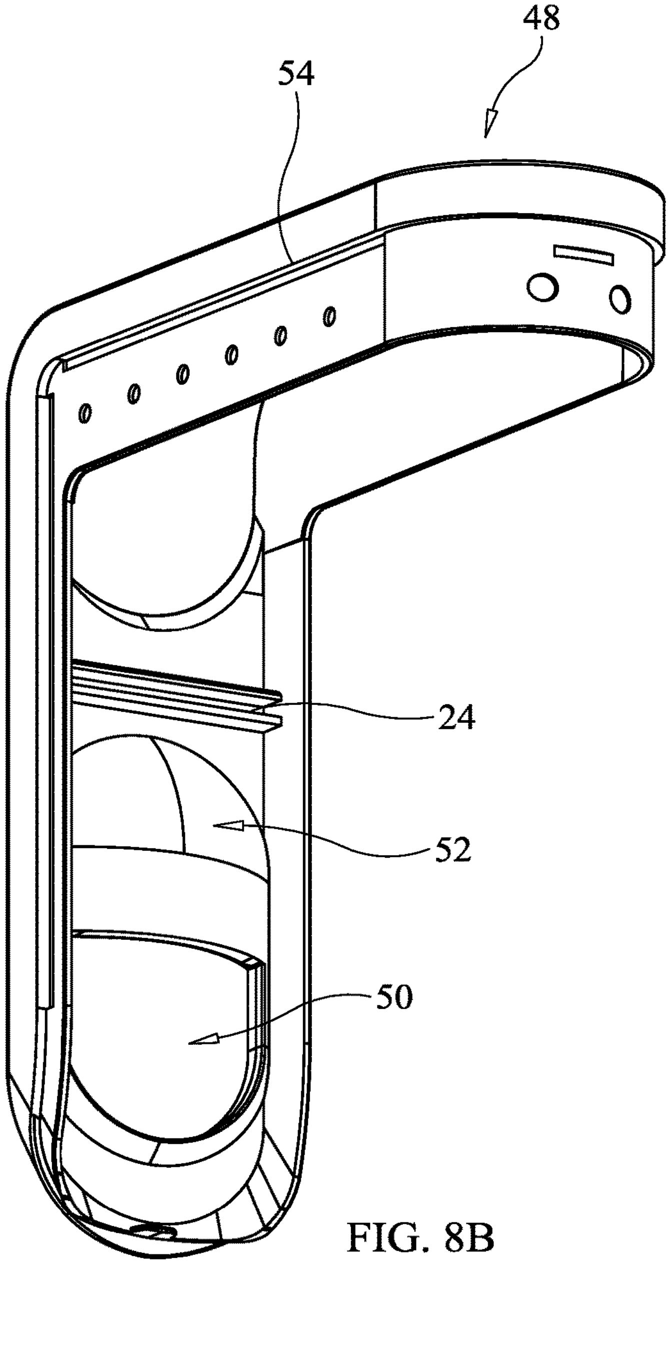

The dispensing base 14 may include a front, front side, or front cap 48 configured to couple to one or both of the front and/or the top of the left side 20 and the right side 22 as best illustrated in FIGS. 8A and 8B. The front side or front cap 48 may be formed of any material, such as metal, wood, and plastic. Typically, a molded or cast plastic is used to form the front side 48. The front side 48 may include a front cap opening, opening, or hole 50 through which the dispensing assembly 16 is configured to be rotated into and out of the dispensing base 14. The front side 48 may include a depression 52 configured to provide sufficient space for a user's finger to manipulate the dispensing assembly 16 when the dispensing assembly 16 is positioned fully within the dispensing base 14. The depression 52 may be at least partially concave in shape, although any shape is permissible. The front side 48 may also include one or more alignment features 54 with complementary structures on the left side 20 and the right side 22. The alignment features 54 may be snap fit structure, key and slot, recesses configured to receive flexible tabs/fingers, and so forth.

The dispensing assembly 16 is best illustrated in FIGS. 9, 10A-10C, 11, and 12A-12D. The dispensing assembly 16 may be formed of any material, such as metal, wood, and plastic. Typically, a molded or cast plastic is used to form the dispensing assembly 16. The dispensing assembly 16 may include a removable cap 56 to provide a tactilely pleasing surface for a user's finger to engage. The removable cap may include a snap-fit or other engagement mechanism configured to couple the removable cap 56 to a complementary shaped engagement mechanism 57 of the dispensing assembly 16.

The dispensing assembly 16 may be configured to rotate about an axis 21 of a hub 23. The hub 23 may be tubular or columnar in shape or have a recess 25 configured to receive a post 27 coupled to and extending away from at least one of the left side 20 and the right side 22 and about which the hub 23 may rotate. The hub 23 may include an upset 24, such as a raised surface, bump, depression, recess, or other shape that provides tactile feedback to a user when the user rotates the dispensing assembly into the dispensing base 14 to indicate that the dispensing assembly 16 is securely received. The upset 24 may engage with a complementary feature 29 on one or both of the left side 20 and the right side 22 to retain the dispensing assembly 16 in its closed or fully received position within the dispensing base 14 until a user engages the removable cap 56 to open or rotate the dispensing assembly 16.

The dispensing assembly 16 may include an arc surface 26. The arc surface 26 optionally may be coupled to and spaced radially apart from the hub 23.

The catch 18 may be coupled to the arc surface 26 and may be of any shape. For example, the catch 18 may have a width 62 and a length 64 selected to accommodate a range of sizes of pills 500. The width 62 and the length 64 may be the same, different, a diameter, or other dimension. The catch may have a single, uniform depth, or it may have a first depth 63 proximate a rear 67 of the catch 18 and a second depth 65 proximate a front 69 of the catch 18. The first depth 67 and the second depth 69 may be the same or different. As an example and as illustrated, the first depth 67 is greater than the second depth 69. The bottom 70 of the catch 18 may be of any shape. As an example, the bottom 70 may be concave, spherical, or hemispherical and be configured to receive the pill 500 and to securely hold the pill 500 as the dispensing assembly rotates and allow a user to easily remove the pill 500. The catch 18 may include at least one cutout 28 where the arc surface is relatively radially closer to the hub 23 than the arc surface 26 at the rear 67 or the front 69 of the catch. The at least one cutout 28 may allow a user to more easily retrieve a pill 500 from the catch with her fingers.

The dispensing assembly 16 may include at least one fin 30 that extends radially away from the arc surface 26. The at least one fin 30 may be positioned rearward from the catch 18 on the arc surface 26. The at least one fin 30 may include a plurality of fins. For example, the plurality of fins 30 may be two or more fins. The fins 30 may be spaced laterally apart a distance 32 on the arc surface 26 or the fins 30 may be in a linear arrangement. The plurality of fins 30 may have the same shape (FIG. 12A-12D) or they may be of different shape (FIG. 10A-10C, 11). The fins 30 may optionally be spaced radially apart (e.g., one closer to the catch 18 and one further from the catch 18) a distance 34. The at least one fin 30 may have a constant chord 36 along a length 38 or the chord 36 may change along the length 38. The at least one fin may have a width 39. The at least one fin 30 may include a fin end 42 with an increased chord 41 relative to a chord 36 of the fin 30.

Figure 27:
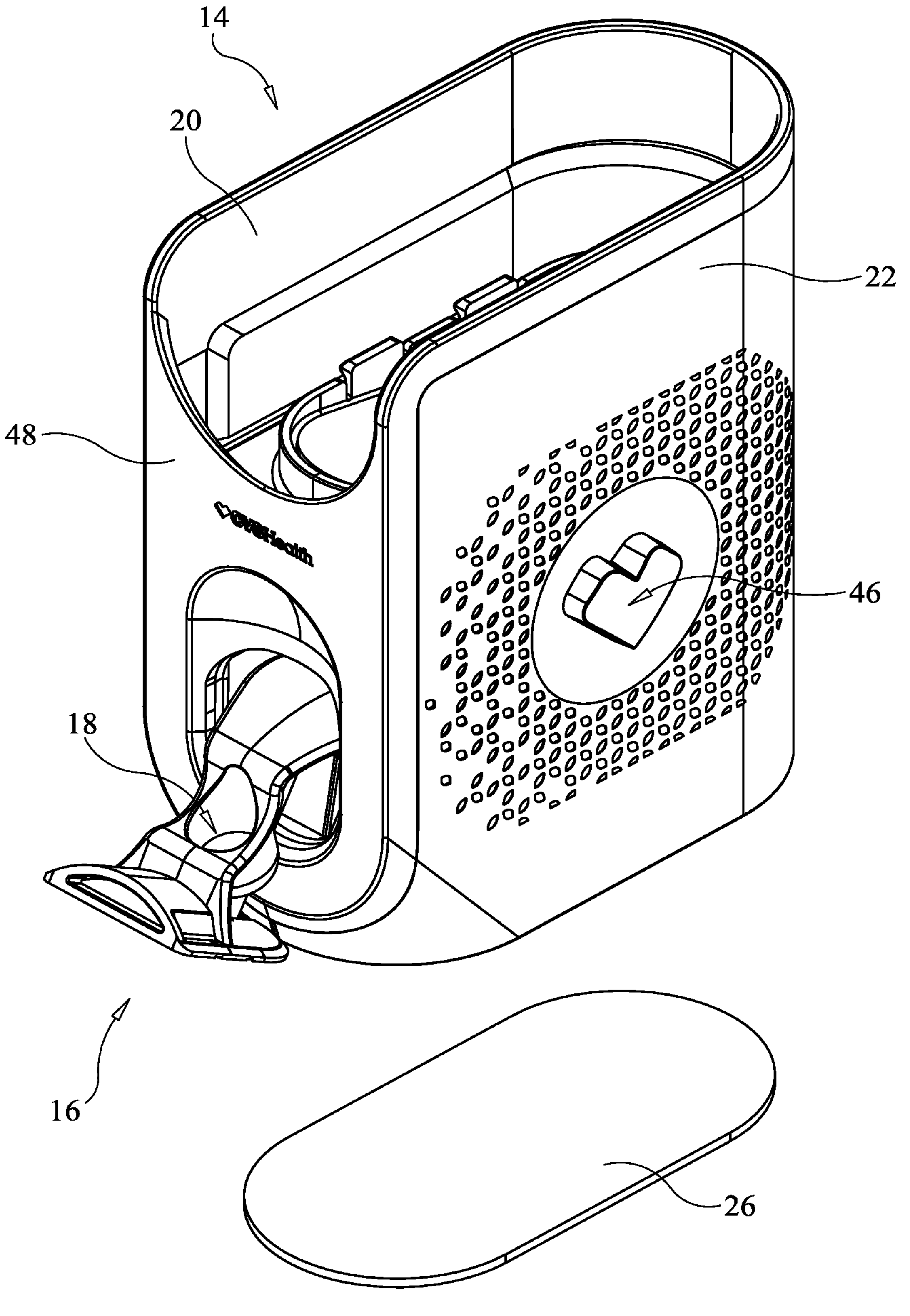

The dispensing base 14 may include a bottom grip 76 on one or both of a portion or an entirety of a bottom of the left side 20 and the right side 22 as illustrated in FIG. 27. The bottom grip 76 may be configured to improve the stability of the dispensing base 14 during normal use as the dispensing base 14 rests upon a countertop or other surface. The bottom grip 76 may be made of rubber, silicone, elastomer, or other material that has a coefficient of friction higher than a coefficient of friction of the material from which the dispensing base 14 is formed. The bottom grip 76 may include a self-adhesive, glue, mechanical connector (hook-and-loop fastener, for example) or other layer (not illustrated) configured to adhere the bottom grip 76 to one or both of the bottom of the left side 20 and the right side 22.

The dispensing base 14 may include a funnel 78, illustrated at FIGS. 9, 13, 14A, 14B, 15, 16A-16C, 18, 23, and 24, configured to receive and convey the pill or pills 500 from the cartridge 12 through the dispensing base 14 and into the catch 18 of the dispensing assembly 16. The funnel 78 may be formed of any material, such as metal, wood, and plastic. Typically, a molded or cast plastic is used to form the funnel 78, which may be made as an integral component or may be formed of two or more subcomponents coupled together via complementary alignment features 77, such as snap fittings (e.g., pin and snap, elastic fingers configured to be received in recesses, key and slots, and the like), adhesives, welding of any type, and the like. The surface of the funnel 78 may be relatively smoother and/or glossier than the surfaces of the dispensing base 14 and other components to reduce a coefficient of friction of the surface of the funnel 78. For example, a coefficient of friction for a polypropylene material from which the funnel 78 may be made may range from 0.23 to 0.44 and a slope angle (not labeled) of the funnel 78 may increase as the coefficient of friction increases. As examples, the slope angle may range from 20 degrees to 70 degrees, from 30 degrees to 60 degrees, and from 40 degrees to 50 degrees, or any ranges between and overlapping these ranges.

The funnel 78 may have a funnel height 79 that should be relatively smaller than a height 131 of the cartridge 12, which could permit a user to better view the number of pills 500 remaining in the cartridge 12. The funnel height 79 may be a function of a funnel slope angle (not labeled) to ensure the funnel slope angle falls within a desired range to ensure the pills 500 slide or flow properly down the funnel 78.

The funnel 78 may have a first funnel length 81 proximate a front of the funnel 78 and a second funnel length 83 proximate a rear of the funnel 78. The first funnel length 81 and the second funnel length 83 may be the same or they may be different. For example, the first funnel length 81 may be shorter (or longer) than the second funnel length 83.

The funnel 78 may include a funnel inlet or throat 80 configured to be positioned proximate a cartridge opening 130 when the cartridge 12 is coupled to the dispensing base 14. Optionally, the funnel inlet 80 may be positioned within the cartridge opening 130 when the cartridge 12 is coupled to the dispensing base 14, which may reduce the risk a pill 500 could become stuck or jammed within the cartridge 12.

The funnel inlet 80 may have an inlet width 82 and an inlet length 84 sized similarly to a cartridge opening width 132 and a cartridge opening length 134, or more commonly the inlet width 82 and the inlet length 84 may be similar in size to any dimension of a pill 500, i.e., smaller than the cartridge opening length 134. The inlet width 82 and the inlet length 84 may be the same and may optionally be a diameter.

The funnel 78 may include an alignment feature or engagement mechanism 86, such as snap fittings (e.g., pin and snap, elastic fingers configured to be received in recesses, key and slots, and the like), configured to removably couple to a funnel latch interface 142 proximate the cartridge opening 130 of the cartridge 14 as described below. The alignment feature or engagement mechanism 86 are flexible enough to permit a user to easily insert the dispensing base 14/funnel 78 into the cartridge opening 130 and to also easily remove the dispensing base 14/funnel 78 from the cartridge opening 130 while being rigid enough to prevent the dispensing base 14/funnel 78 from being unintentionally removed from the cartridge opening 130 in the event the modular dispenser 10 is unintentionally overturned or upset.

Figure 13:
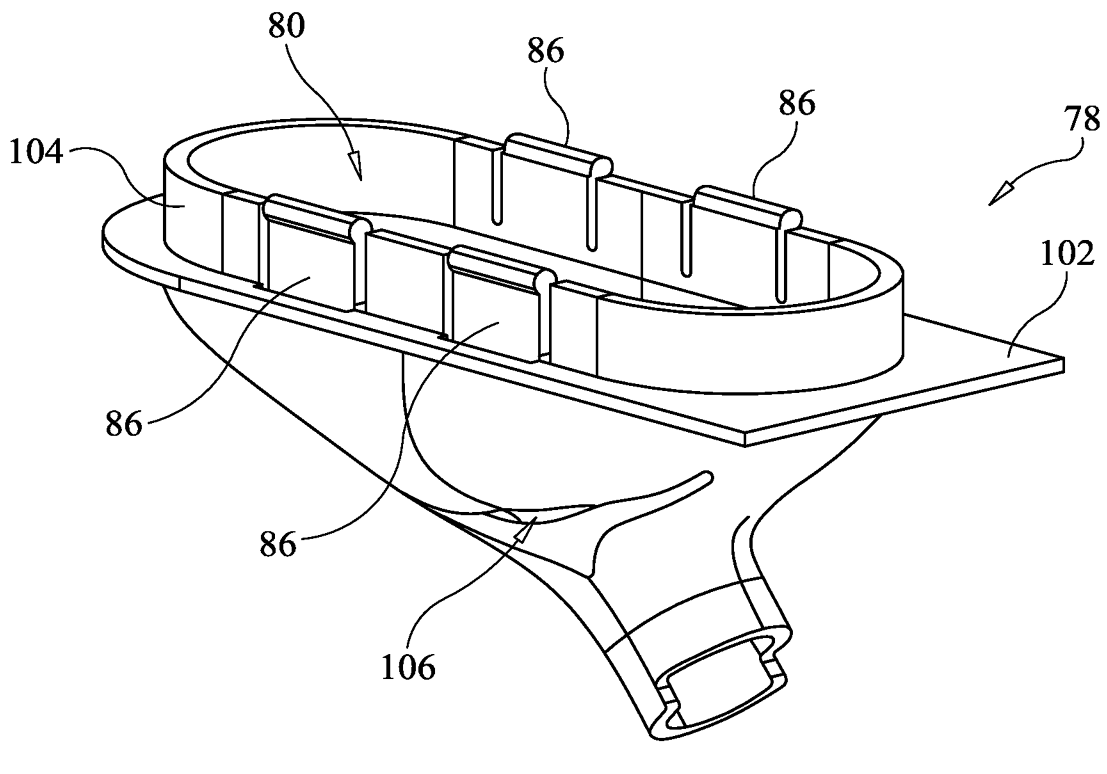
FIG. 13 is a perspective view of an example of a funnel.
Figure 14A:
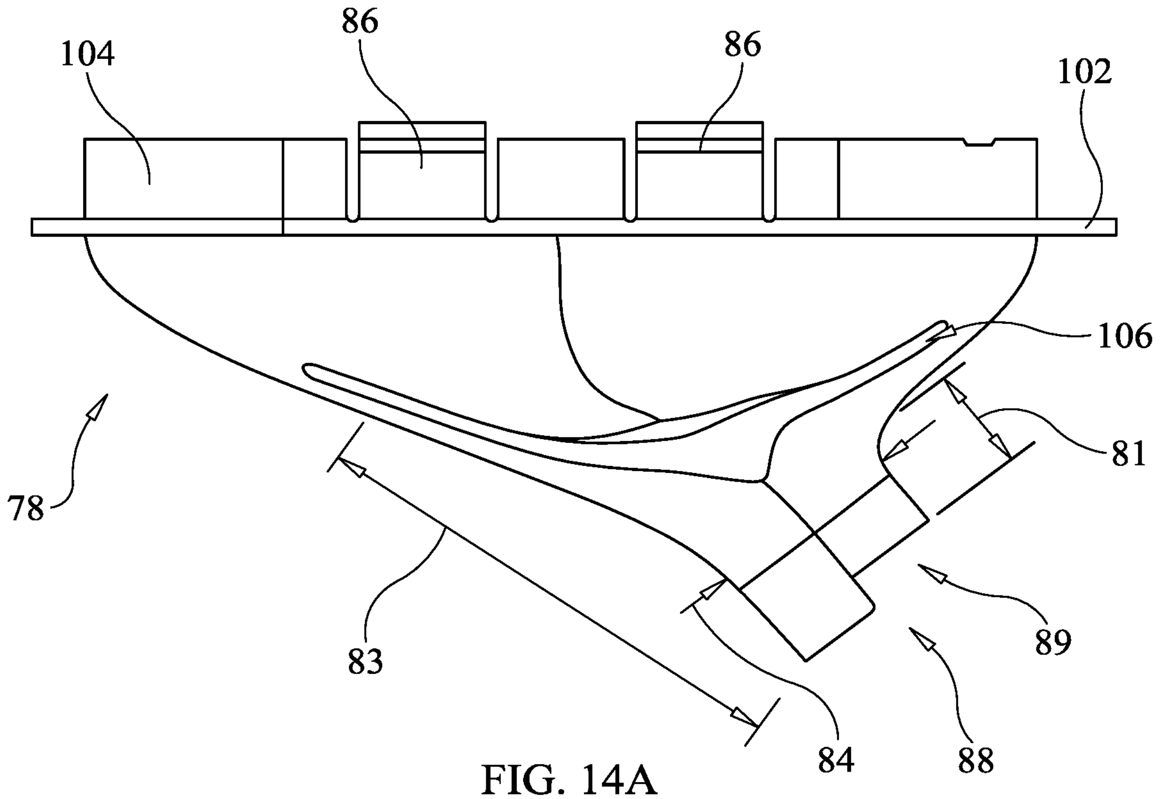
FIGS. 14A and 14B are plan views of the funnel of FIG. 13.
Figure 14B:
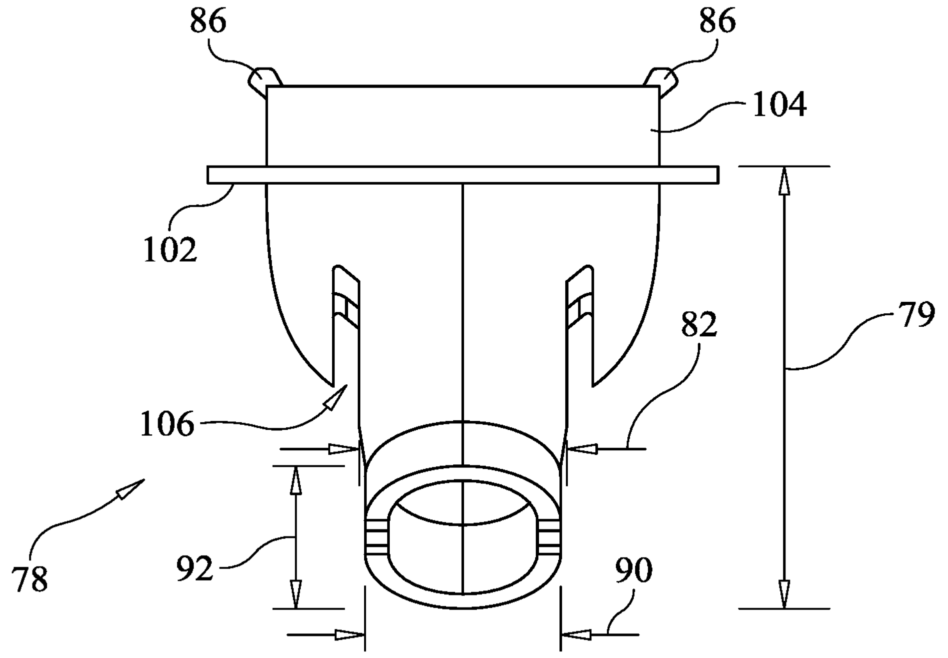
Figure 15:
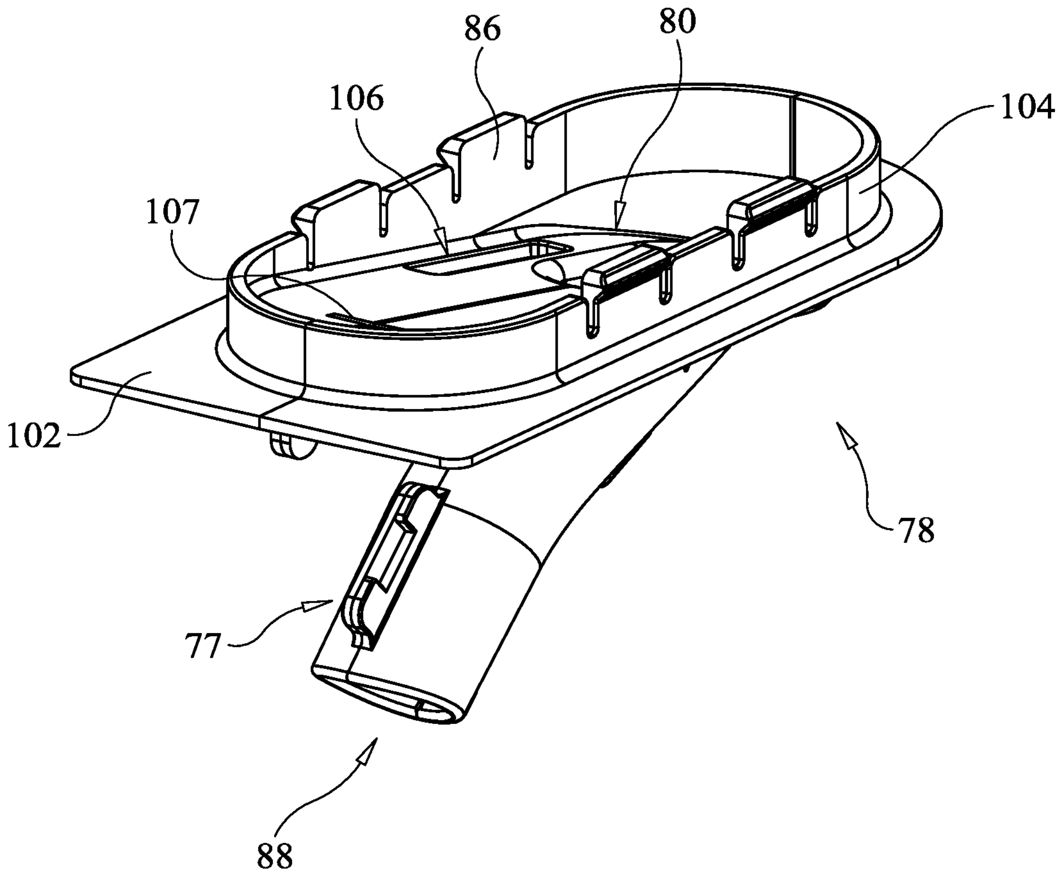
FIG. 15 is a perspective view of another example of a funnel.
Figure 16A:
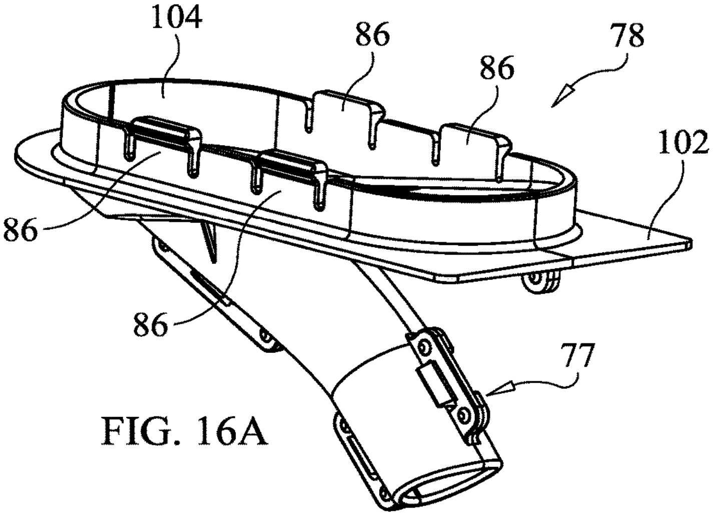
FIG. 16A-16C are perspective and plan views of the funnel of FIG. 15.
Figure 16B:
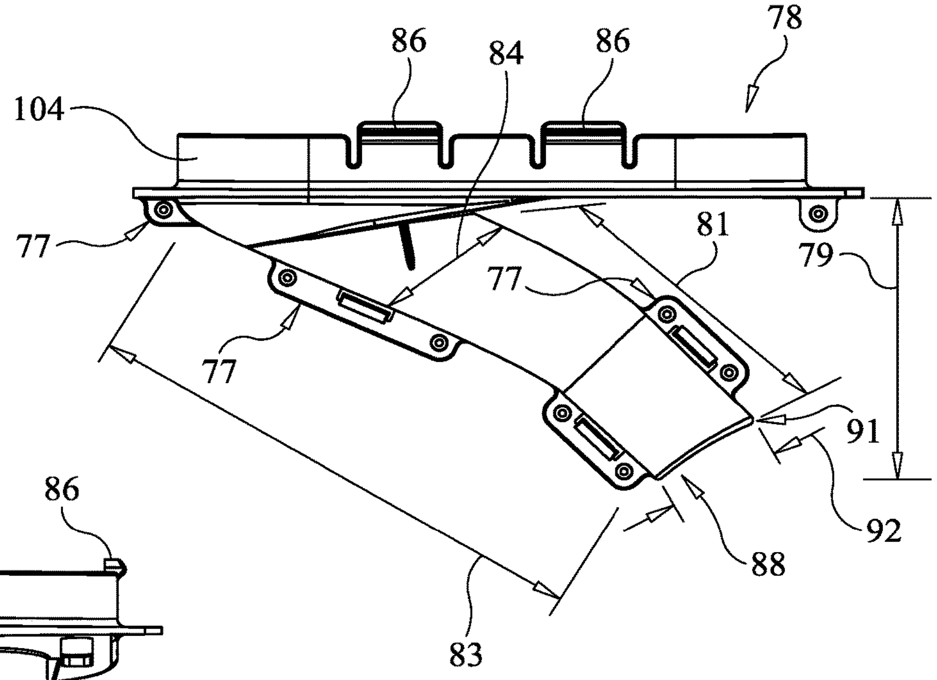
Figure 16C:
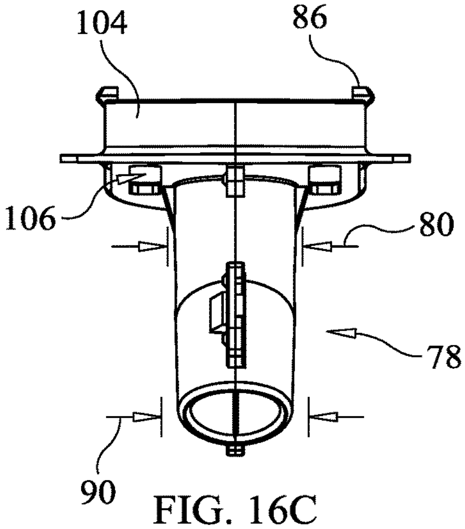
Figure 17A:
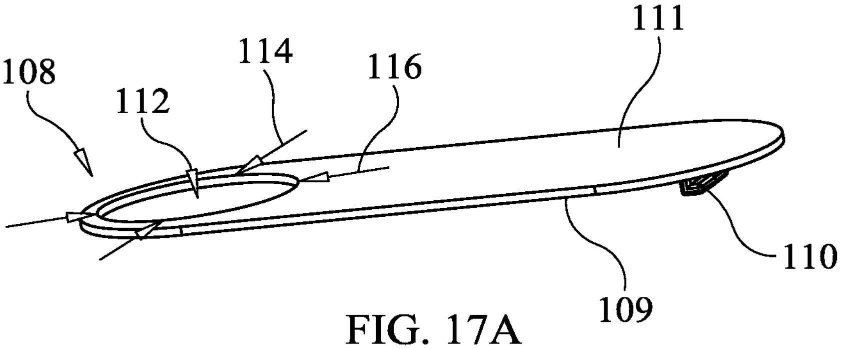
FIGS. 17A and 17B are perspective views of an example of a flipper and the flipper in the funnel of FIG. 15.
Figure 17B:
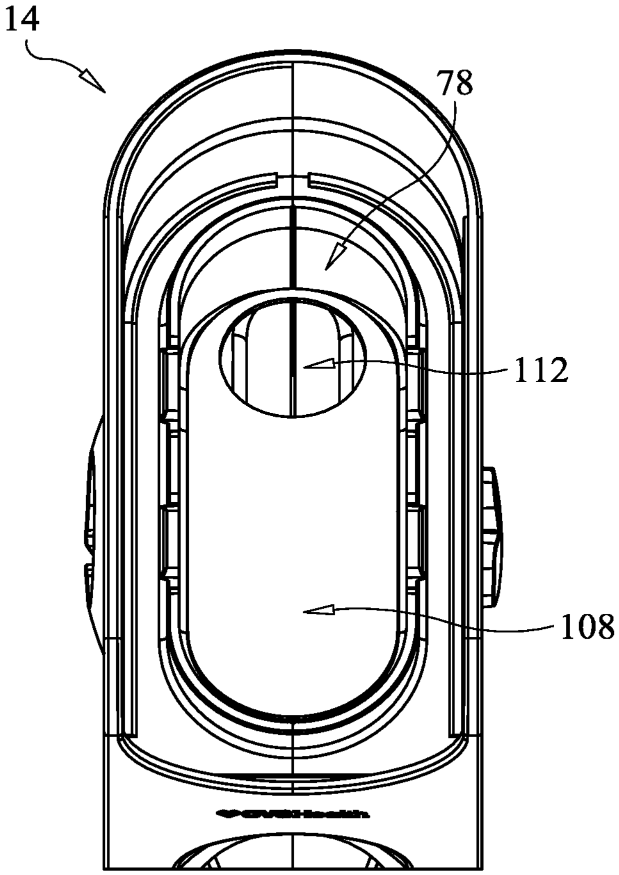

The funnel 78 also includes a funnel outlet 88 spaced apart from the funnel inlet 80 as best illustrated in FIGS. 13 and 15. The funnel outlet 88 is configured to be positioned proximate the catch 18 of the dispensing assembly 16 when the dispensing assembly 16 is positioned within the dispensing base 14. The funnel outlet 88 includes an outlet width 90 and an outlet length 92, which individually and collectively may be sized and shaped to enable a pill 500 to flow easily through the funnel outlet 88 without the pill 500 jamming or otherwise occluding the funnel outlet 88. The outlet width 90 and the outlet length 92 may be the same and may optionally be a diameter. The funnel outlet 88 may optionally be profiled to include a cutout 89 or an extension 91 along a front portion of the funnel outlet 88.

The funnel 78 may include a funnel platform 102 that extends laterally away from the funnel 78. The funnel platform 102 may extend partially or wholly around the funnel 78. The funnel platform 102 may optionally be sized and shaped to be received upon or between one or more of the pair of ribs 24 of the dispensing base 14.

The funnel 78 also optionally includes a funnel parapet 104 extending away from the funnel 78 towards the opening 130 of the cartridge 12 when the cartridge 12 is coupled to the dispensing base 12/funnel 78. At least one of the funnel parapet 104 and the perimeter 136 of the opening 130 of the cartridge includes an alignment feature or engagement mechanism 86 configured to engage the other of the funnel parapet 104 and the perimeter 136 of the opening 130 of the cartridge 12. As discussed above, the alignment feature or engagement mechanism 86 may include a snap-fitting configured to engage a ridge or tapered surface 146 on the perimeter 136 of the opening 130 of the cartridge 12.

The funnel 78 optionally includes at least one and, in some examples, at least a pair of slots 106 through which the at least one or the plurality of fins 30 are configured to pass and rotate. The slots 106 may optionally be positioned one the same side of the funnel 78 or on opposite sides of the funnel 78. The slots 106 may be sufficiently wide and long so as to allow the fins 30 to pass freely without interference or binding.

The funnel may also include a retention mechanism 107 configured to retain a flipper 108 as will be described below. The retention mechanism 107 may be a slot, recess, snap connection, or other coupling that provides flexible or movable retention of the flipper 108 within the funnel 78.

The dispensing base 14 may also include a metering flap, flap, or flipper 108 as illustrated in FIGS. 17A, 17B, 23, and 24. The flipper 108 may be formed of any material, such as metal, wood, and plastic. Typically, a molded or cast plastic is used to form the flipper 108. The flipper 108 may optionally be flexible. The flipper 108 optionally is planar with a lower surface 109 spaced apart from an upper surface 111.

The flipper 108 may include a retainer 110 configured to engage with the retention mechanism 107 of the funnel 78 and movably retain the flipper 108 within the funnel 78. Optionally, the flipper 108 may be pivotably retained within the funnel 78. The retainer 110 may be a bar, rod, T-bar, snap connection, or other coupling that provides flexible, movable, rotatable, or pivotable retention of the flipper 108 within the funnel 78. For example and as illustrated, the retainer 110 is a T-bar that can be inserted into the retention mechanism/slot 107 of the funnel 78, after which the flipper 108 is rotated into a position for use within the funnel 78. The flipper 108 may be of any shape or size but typically fits within the funnel 78.

The flipper 108 may also include an opening 112 with a width 114 and a length 116. The width 114 and the length 116 may be the same and may optionally be a diameter. The size of the opening 112 is configured to permit a pill 500 to be dispensed into the funnel inlet 80 while reducing the risk the pill 500 or a plurality of pills 500 jam the funnel inlet 80.

Figure 9:
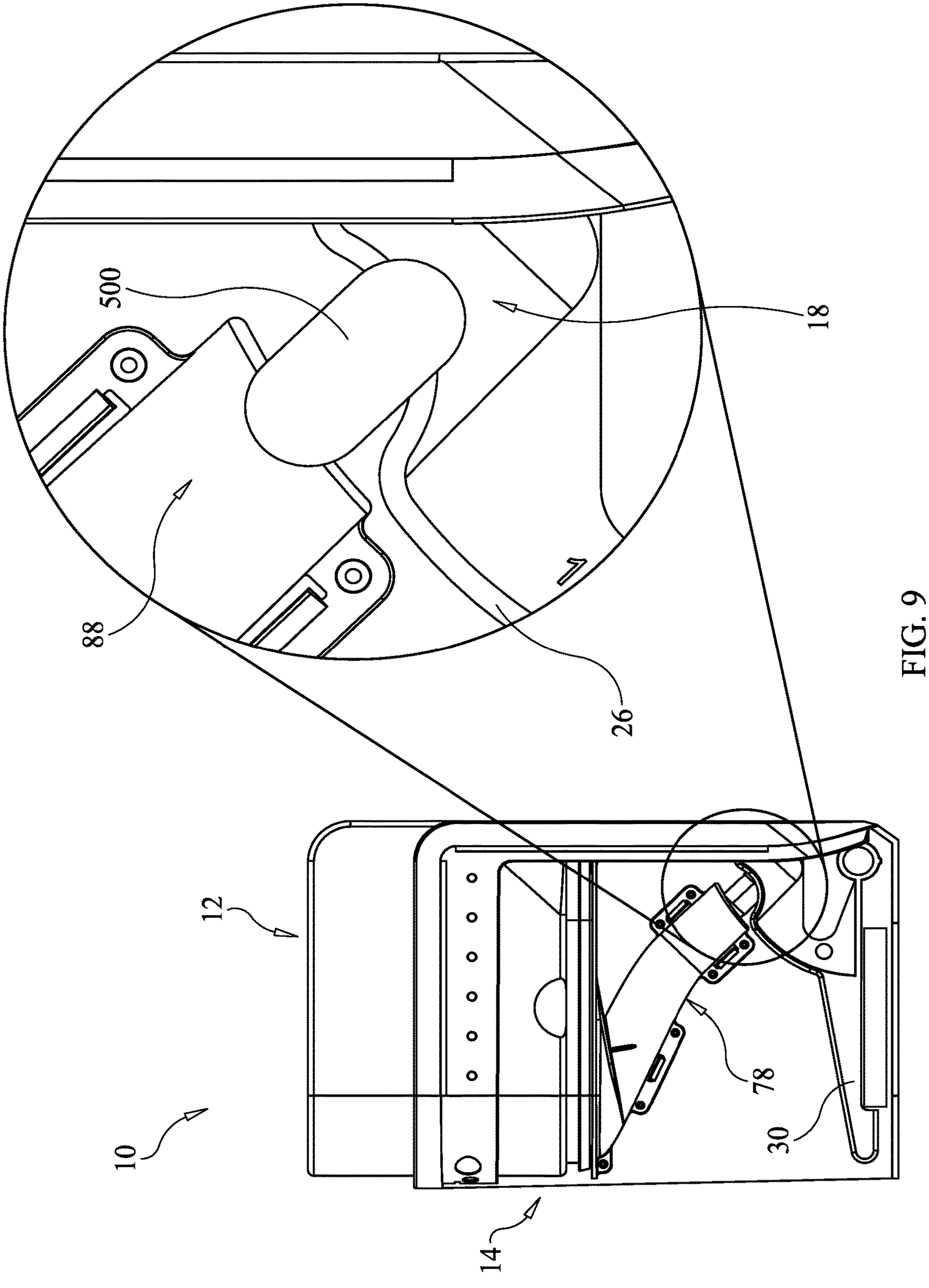
FIG. 9 is an x-ray view and close-up view of the modular dispenser dispensing a pill.
Figure 10A:
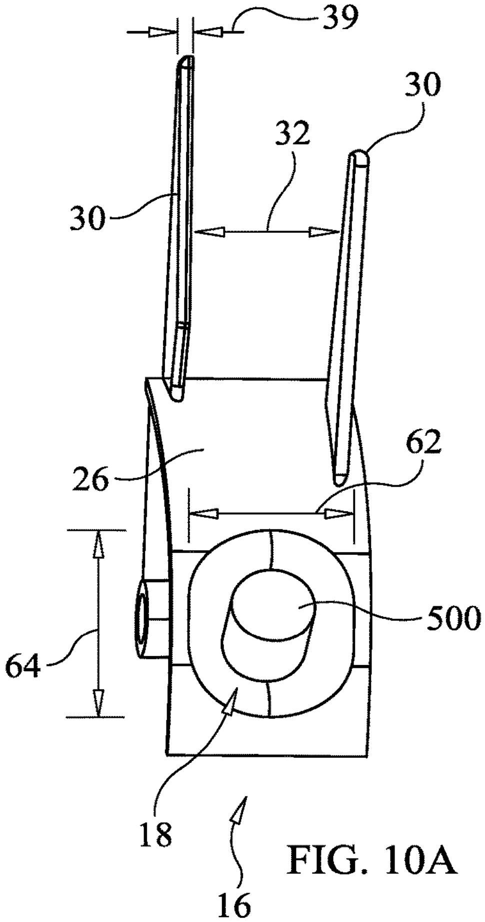
FIG. 10A-10C are perspective and plan views of an example of a dispensing assembly.
Figure 10B:
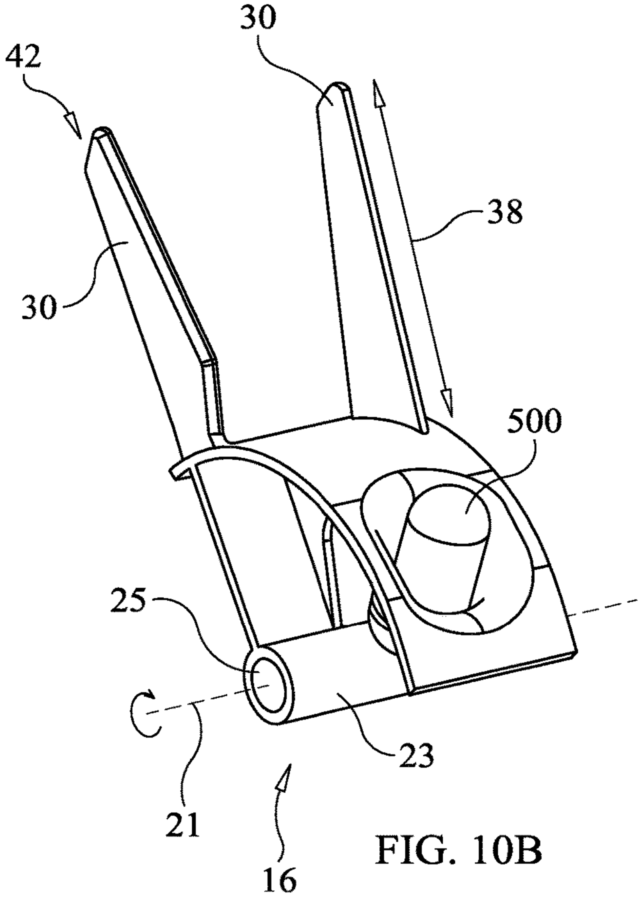
Figure 10C:
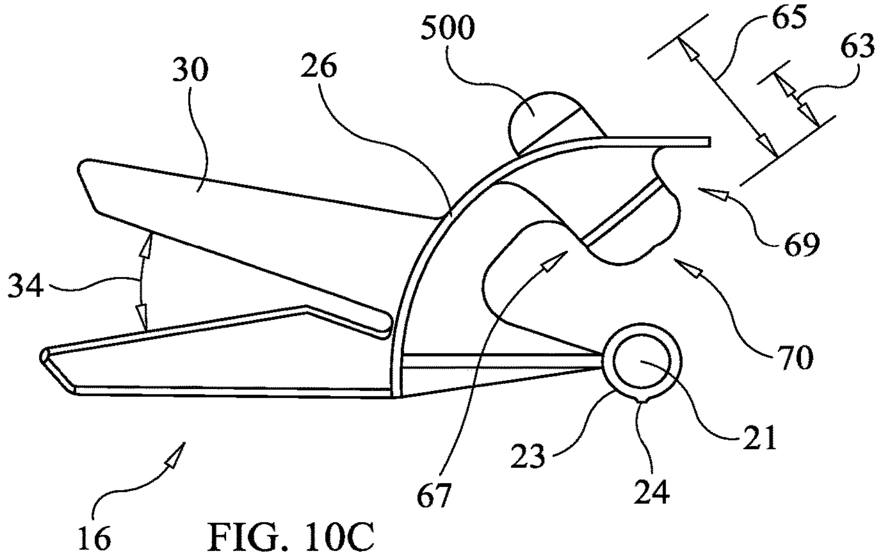
Figure 11:
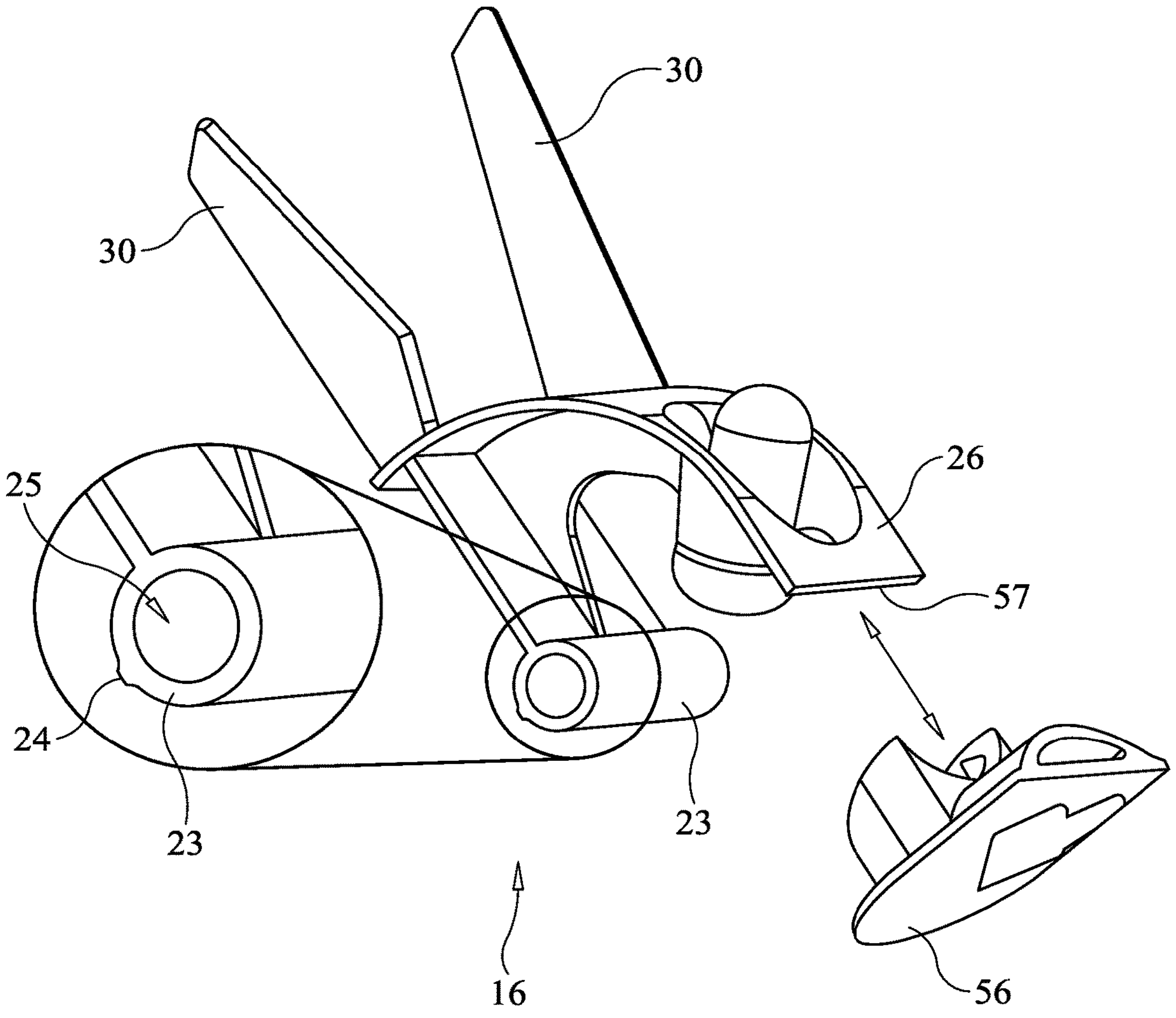
FIG. 11 is a perspective view and close-up of the dispensing assembly of FIG. 10A-10C.
Figure 12C:
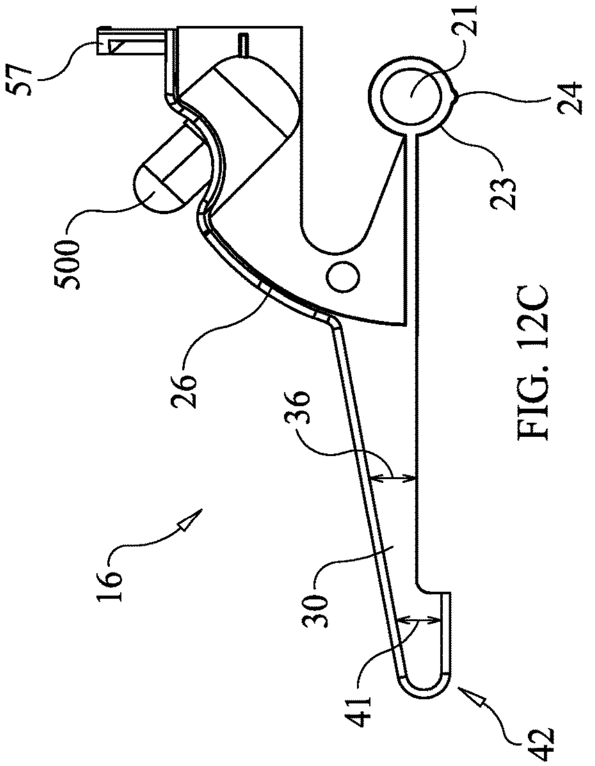
FIG. 12A-12C are perspective and plan views of another example of a dispensing assembly.
Figure 12B:
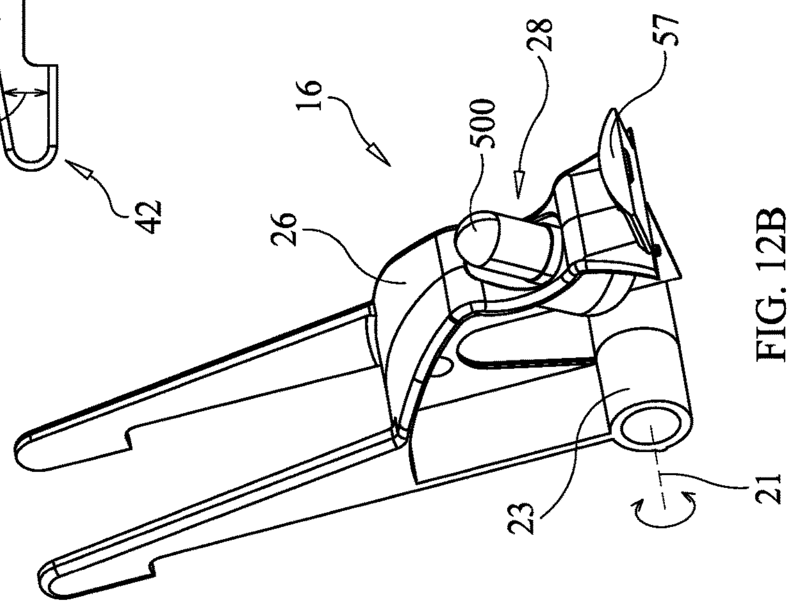
Figure 12A:
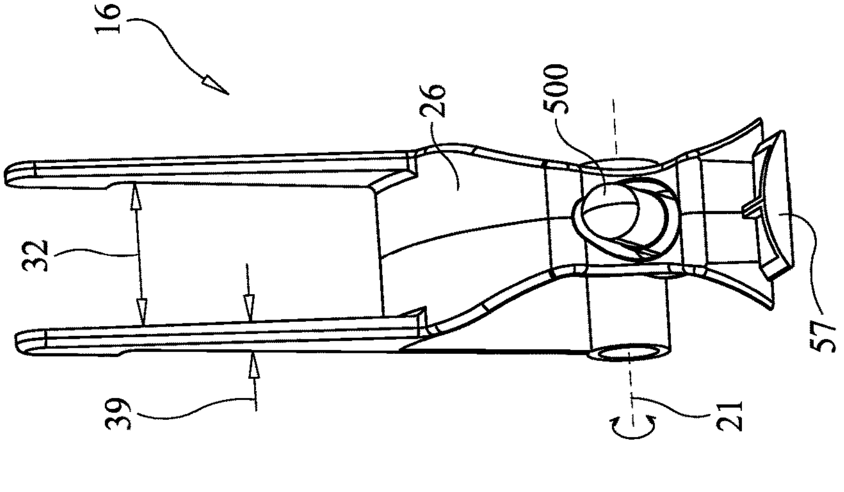
Figure 12D:
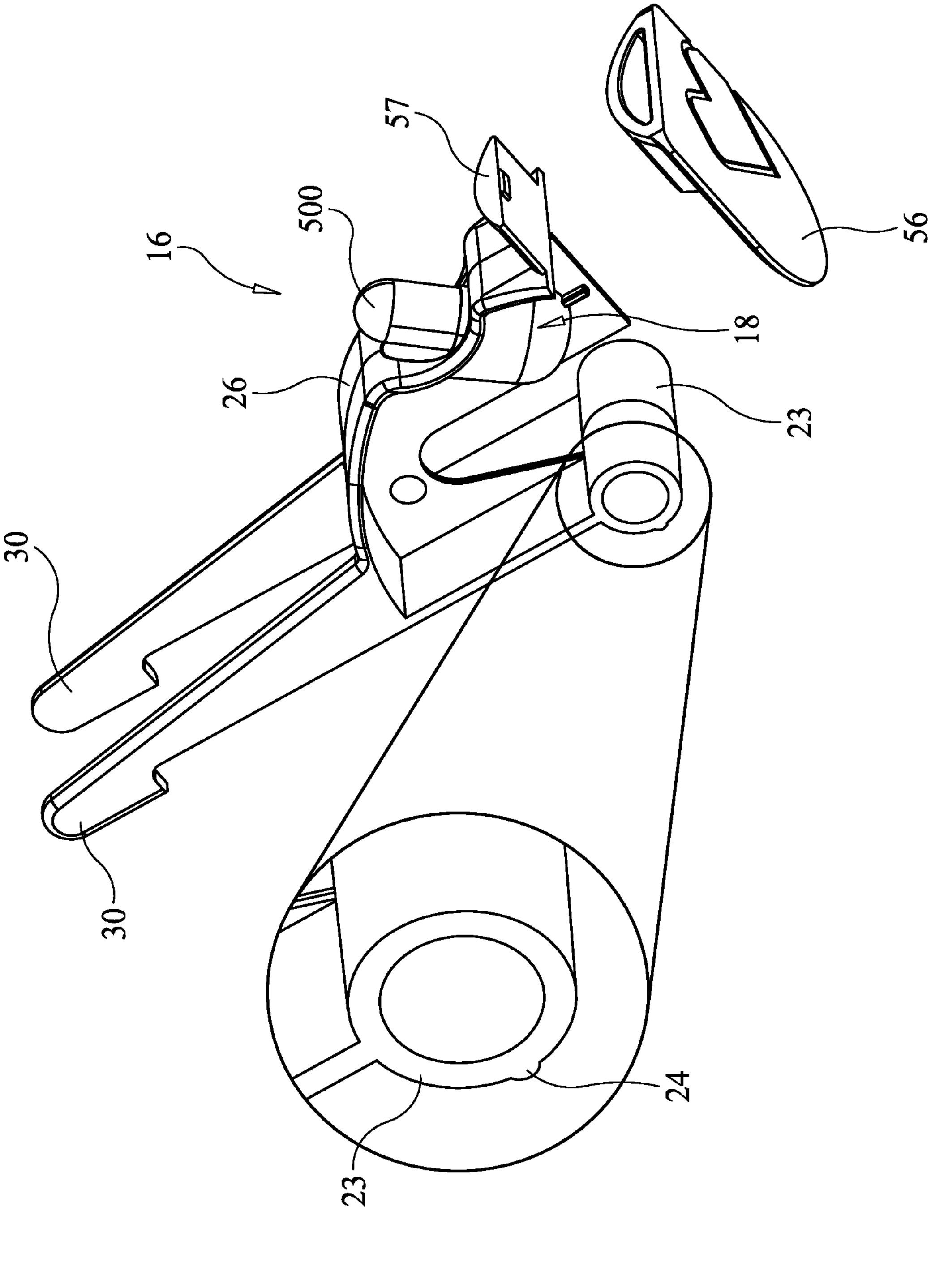
FIG. 12D is a perspective view and close-up of the dispensing assembly of FIG. 12A-12C.
Figure 18:
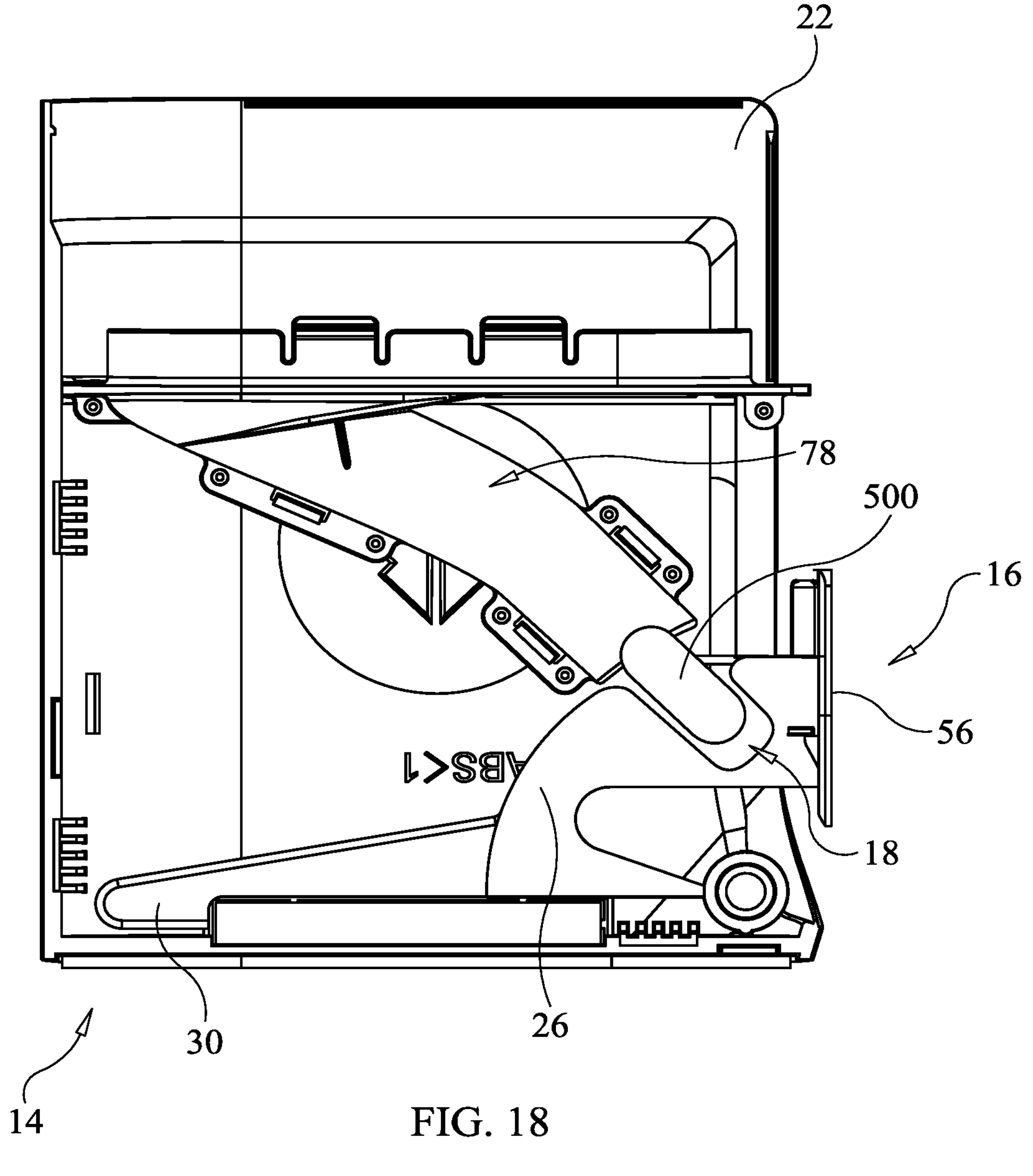
FIG. 18 is an x-ray view of another example of a modular dispenser dispensing a pill.
Figure 19:
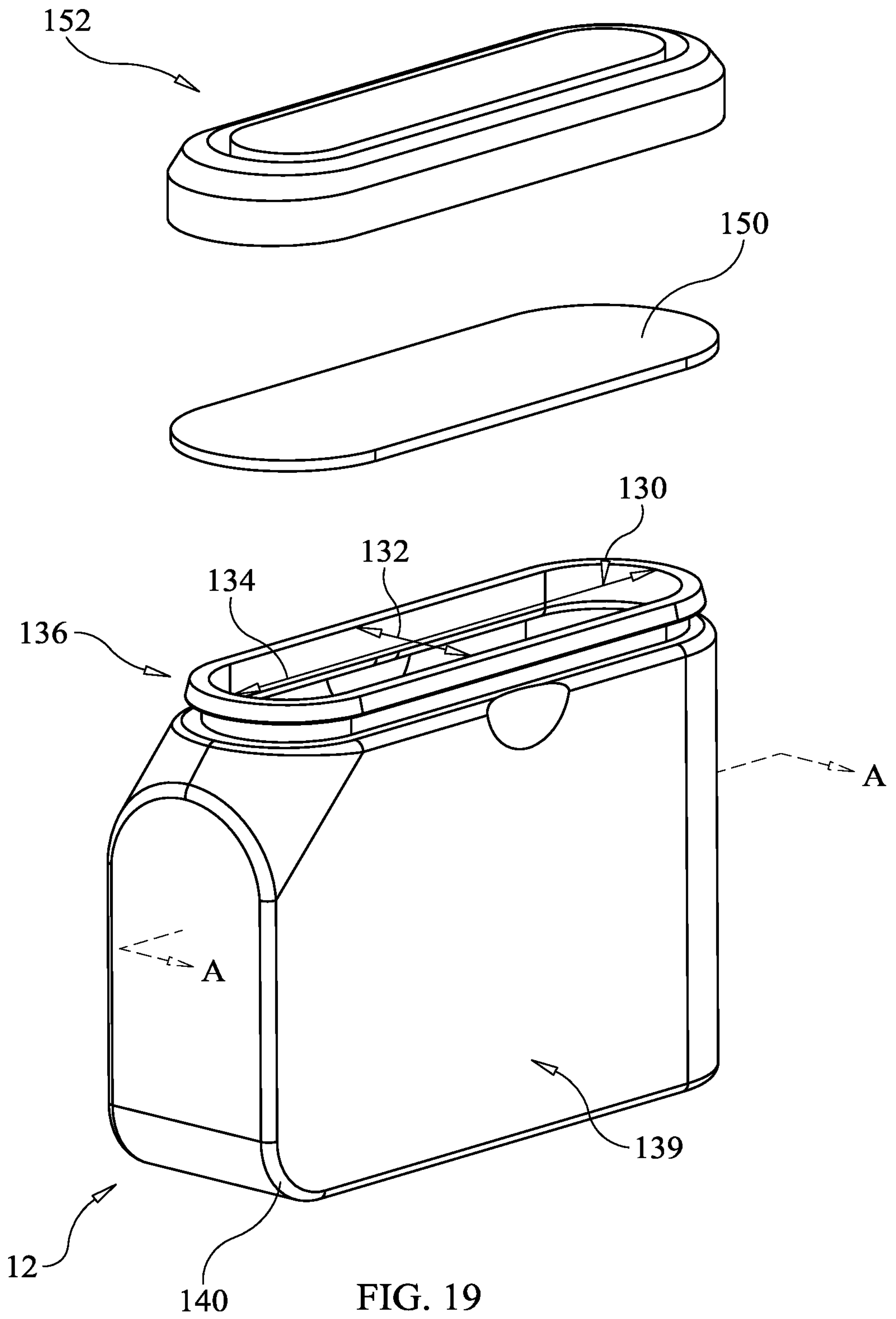
FIG. 19 is an exploded view of an example of a cartridge, a tamper evident seal, and a lid.
Figure 20A:
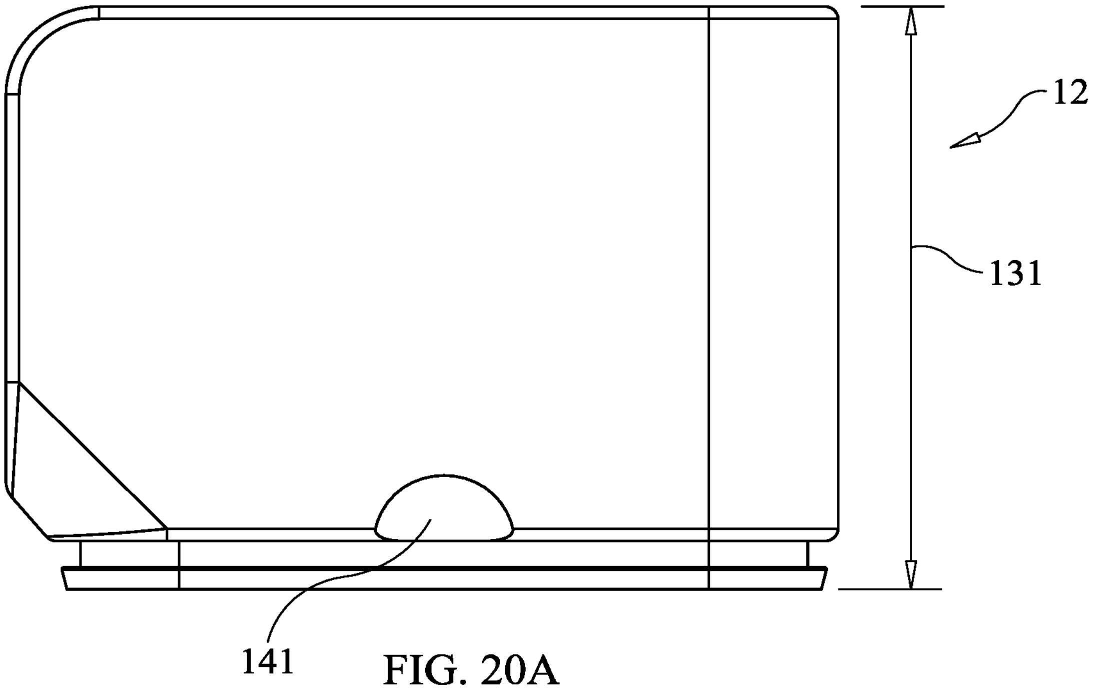
FIGS. 20A and 20B are plan views of the cartridge of FIG. 19.
Figure 20B:
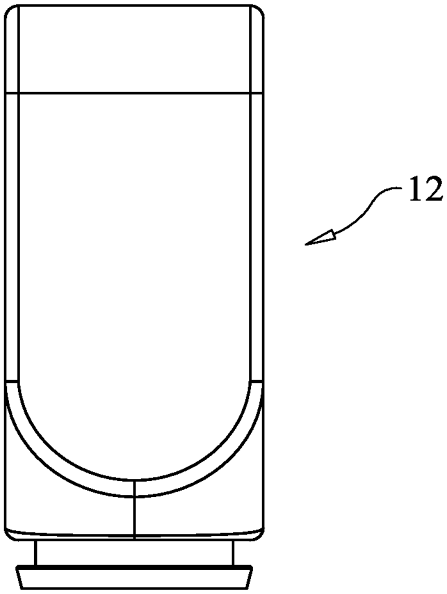

In practice as illustrated at FIGS. 9 and 18, when a user opens or rotates the dispensing assembly 16 away from the dispensing base 14, the at least one fin 30 is also rotated. The fin 30 extends through the slot 106. As the fin 30 rotates, the fin end 42 may begin to engage a lower surface 109 of the flipper 108, thereby agitating or causing the flipper to flex and/or raise or rotate upward in a direction away from the fin end 42. The movement of the flipper 108, constrained to some degree by the retainer 110, agitates a pill or pills 500 within an upper portion of the funnel 78 and/or within the cartridge 12. The agitation of the pill 500 may assist in causing the pill 500 to enter the funnel inlet 80 under an influence of gravity. Stated differently, the cooperative movement of the fin 30 and the flipper 108 may improve the fluidity of the pills 500 and reduce the risk the pills 500 become compacted or jammed within the funnel 78 or the cartridge 12.

The cartridge 12 may be formed of any material, such as metal, wood, and plastic. Typically, a molded or cast plastic is used to form the cartridge 12. The plastic optionally may be transparent, semi-transparent, or translucent to allow a user to view the pills 500 within the cartridge 12.

The cartridge 12 may include an opening or cartridge opening 130 through which the pills 500 may be initially loaded and from which the pills 500 may descend under the influence of gravity when the cartridge 12 is coupled to the funnel 78 and/or dispensing base 14. The cartridge opening includes an opening width 132 and an opening length 134. The opening 130 may also include a perimeter 136 that surrounds the opening 130. Optionally, the cartridge 12 may be of any shape. For example, the shape of cartridge 12 may be keyed to the shape of the dispensing base 14/funnel 78 so that the proper orientation of the cartridge 12 relative to the dispensing base 14/funnel 78 is visually and/or tactilely apparent.

An interior surface 137 of the cartridge 12 may be vertical or sloped to improve the ability of the pills 500 to move through the cartridge 12 and into the funnel 78 under the influence of gravity and to reduce the risk that any pill 500 would become stuck or retained within the cartridge 12 under normal use.

One or more radii 140 may be present about an exterior surface 139 of the cartridge 12. The radii 140 may provide a smooth intersection of two surfaces rather than a sharp corner. The cartridge 12 may also include at least one recess 141 in the exterior surface 139. The recess 141 may be concave and/or hemispherical in shape and be configured to allow a user to use her finger to gain purchase under the lid 152 when the lid 152 is positioned upon the cartridge so as to reduce the effort required to remove the lid 152 from the cartridge 12.

Figure 21A:
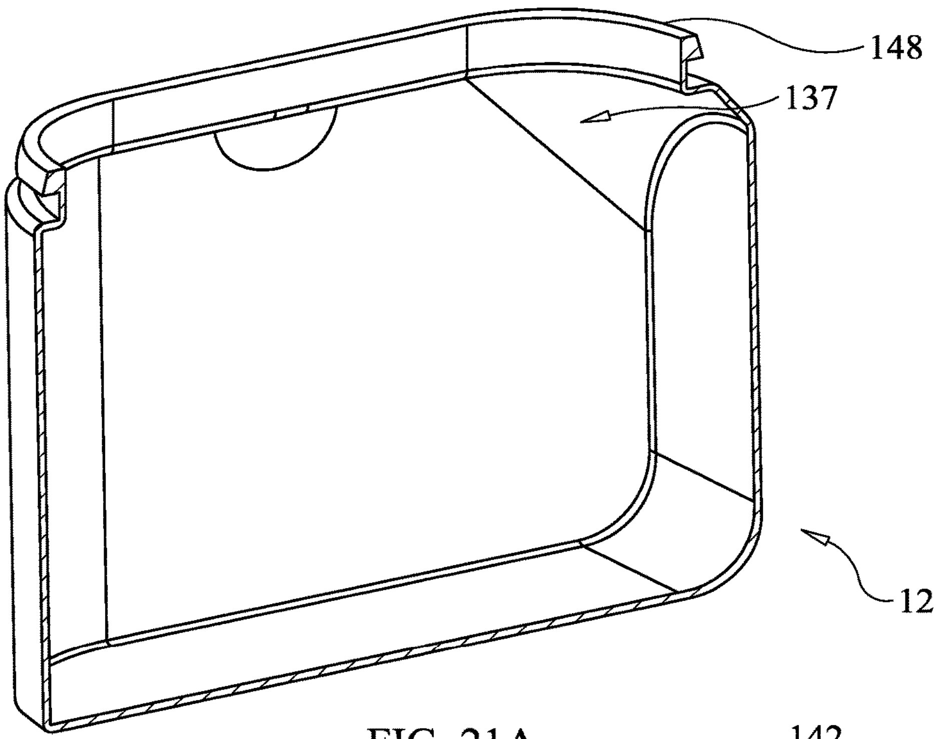
FIG. 21A-21C are a cross-section A-A and close-up views of the cartridge of FIG. 19.
Figure 21B:
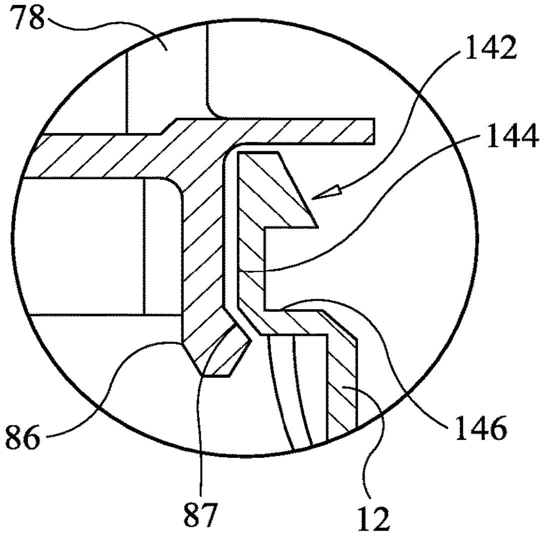

The opening 130 may include a funnel latch interface 142 configured to engage with the alignment mechanism or engagement mechanism 86 of the funnel 78 as illustrated in FIG. 21B. The funnel latch interface 142 may include a vertical portion 144 and/or a tapered portion 146 configured to engage with the alignment feature or engagement mechanism 86 and/or a latch 87 of the engagement mechanism 86. The configuration of the engagement mechanism 86 and the funnel latch interface 142 should reduce the risk that a pill or pills 500 might become lodged or stuck against the engagement mechanism 86 and the funnel latch interface 142. The funnel latch interface 142 may also include a tapered surface 148. The tapered surface 148 may be spaced apart from the vertical surface 144. The tapered surface 148 of the funnel latch interface 142 may be configured to engage with a latching mechanism 154 of the lid 152.

The cartridge perimeter 136 may include a lip 148 configured to receive a removable tamper evident seal 150. The tamper evident seal 150 may include a pull-tab (not illustrated) to allow a user a surface to grasp when removing the tamper evident seal 150 prior to inserting the cartridge 12 into the dispensing base 14.

Figure 21C:
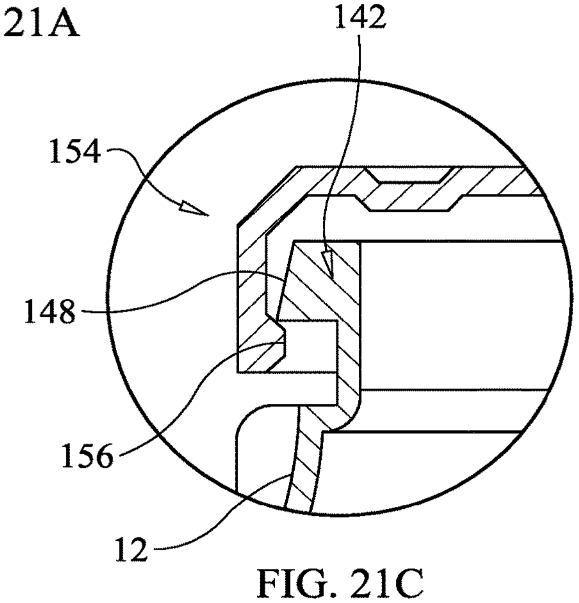

The cartridge 12 optionally also includes a lid 152 configured to be coupled the cartridge 12 and to removably cover the opening 130. The lid 152 may be formed of any material, such as metal, wood, and plastic. Typically, a molded or cast plastic is used to form the lid 152. The lid 152 may optionally be flexible. The lid 152 may be symmetrical about a long axis and/or or a short axis. The lid 152 may include a latching mechanism 154 configured to engage with the funnel latch mechanism 142. For example, a flexible snap 156 of the latching mechanism 154 may engage with the tapered surface 148 of the funnel latch mechanism 142 as illustrated in FIG. 21C.

An example of assembling a modular dispenser 10 for pills 500 is illustrated in FIG. 23-27. The method includes positioning the funnel 78 adjacent to one of the left panel 20 and the right panel 22 of the dispensing base 14, with the funnel 78 including the funnel inlet 80 and the funnel outlet 88. Optionally, the method includes movably coupling the flipper 108 to the funnel 78. The method may further include positioning the dispensing assembly 16 with the least one catch 18 proximate to the funnel 78 and adjacent to one of the left panel 20 and the right panel 22 of the dispensing base 14 to which the funnel 78 is positioned. The method may include rotating the at least one catch 18 away from the funnel outlet 88. The method may further include coupling the left panel 20 to the right panel 22 of the dispensing base 14. Optionally, the method also includes coupling the front cap 48 to the left panel 20 and the right panel 22.

A number of implementations have been described. Nevertheless, it will be understood that additional modifications may be made without departing from the scope of the inventive concepts described herein, and, accordingly, other examples are within the scope of the following claims.

What is claimed is:

1. A modular dispenser, comprising:

a cartridge configured to hold a plurality of pills, the cartridge comprising an opening through which at least one pill is configured to pass under an influence of gravity;

a dispensing base configured to removably receive the cartridge, the dispensing base comprising a funnel, the funnel comprising:

a funnel inlet;

a funnel outlet spaced apart from the funnel inlet; and at least one flipper movably retained within the funnel; and a dispensing assembly rotatably coupled to the dispensing base, wherein the dispensing assembly comprises:

an arc surface coupled to and spaced radially apart from a hub about which the dispensing assembly rotates, wherein the arc surface comprises at least one fin extending radially away from the arc surface; and a catch configured to:

receive the at least one pill when the catch is proximate the funnel outlet; and rotate away from the funnel outlet to a position from which the at least one pill is retrievable by a user.

2. The modular dispenser of claim 1, wherein the dispensing assembly is configured to rotate in a plane perpendicular to a width of the dispensing base.

3. The modular dispenser of claim 1, wherein the catch is coupled to the arc surface.

4. The modular dispenser of claim 1, wherein the at least one fin extends through a slot in a well of the funnel.

5. The modular dispenser of claim 4, wherein the at least one fin comprises a plurality of fins.

6. The modular dispenser of claim 5, wherein each fin of the plurality of fins is spaced laterally apart from each other fin.

7. The modular dispenser of claim 4, wherein:

the funnel comprises at least one flipper movably retained within the funnel; and the at least one fin is configured to agitate the at least one flipper as the catch rotates away from the funnel outlet.

8. The modular dispenser of claim 7, wherein the at least one flipper comprises an opening proximate the funnel inlet.

9. The modular dispenser of claim 7, wherein the at least one flipper is flexible and is configured to return to an at rest position after the catch is fully rotated towards the funnel outlet.

10. A modular dispensing base configured to dispense at least one pill under an influence of gravity, the modular dispensing base comprising:

a funnel comprising:

a funnel inlet;

a funnel outlet spaced apart from the funnel inlet; and at least one flipper movably retained within the funnel; and a rotatable dispensing assembly, wherein the dispensing assembly comprises:

an arc surface coupled to and spaced radially apart from a hub about which the dispensing assembly rotates, wherein the arc surface comprises at least one fin extending radially away from the arc surface; and a catch configured to:

receive the at least one pill when the catch is proximate the funnel outlet; and rotate away from the funnel outlet to a position from which the at least one pill is retrievable by a user.

11. The modular dispensing base of claim 10, wherein the at least one flipper comprises an opening proximate the funnel inlet.

12. The modular dispensing base of claim 10, wherein the at least one fin is configured to agitate the at least one flipper as the catch rotates away from the funnel outlet.

13. The modular dispensing base of claim 12, wherein the at least one flipper is flexible and is configured to return to an at rest position after the catch is fully rotated towards the funnel outlet.

14. The modular dispensing base of claim 10, wherein the at least one fin extends through a slot in a well of the funnel.

15. The modular dispensing base of claim 10, wherein the at least one fin comprises a plurality of fins.

16. A modular dispensing base configured to dispense at least one pill under an influence of gravity, the modular dispensing base comprising:

a funnel comprising:

a funnel inlet;

a funnel outlet spaced apart from the funnel inlet;

a slot in a well of the funnel; and, at least one flipper movably retained within the funnel; and, a rotatable dispensing assembly, wherein the dispensing assembly comprises:

an arc surface coupled to and spaced radially apart from a hub about which the dispensing assembly rotates, wherein the arc surface comprises at least one fin extending radially away from the arc surface through the slot in the well of the funnel; and, a catch configured to:

receive the at least one pill when the catch is proximate the funnel outlet; and rotate away from the funnel outlet to a position from which the at least one pill is retrievable by a user.

17. The modular dispensing base of claim 16, wherein the at least one flipper comprises an opening proximate the funnel inlet.

18. The modular dispensing base of claim 16, wherein the at least one fin is configured to agitate the at least one flipper as the catch rotates away from the funnel outlet.

19. The modular dispensing base of claim 16, wherein the at least one fin comprises a plurality of fins.

20. The modular dispensing base of claim 16, wherein the at least one flipper is flexible and is configured to return to an at rest position after the catch is fully rotated towards the funnel outlet.

* * * * *